US012776735B2

(12) United States Patent
Takase et al.

(10) Patent No.: US 12,776,735 B2
(45) Date of Patent: Oct. 27, 2026

(54) POWER CONVERSION DEVICE AND CONTROL METHOD

(71) Applicant: KABUSHIKI KAISHA YASKAWA DENKI, Kitakyushu (JP)

(72) Inventors: Yoshiyasu Takase, Fukuoka (JP); Akira Yamazaki, Fukuoka (JP); Yasumasa Hamabe, Fukuoka (JP); Takahiro Saeki, Fukuoka (JP)

( * ) Notice: Subject to any disclaimer, the term of this patent is extended or adjusted under 35 U.S.C. 154(b) by 206 days.

(21) Appl. No.: 18/672,013

(22) Filed: May 23, 2024

(65) Prior Publication Data

US 2024/0396483 A1 Nov. 28, 2024

(30) Foreign Application Priority Data

May 26, 2023 (JP) ................................ 2023-087185

(51) Int. Cl.

| | |
|---|---|
| ***H02P 27/08*** | (2006.01) |
| ***H02P 21/00*** | (2016.01) |
| ***H02P 21/14*** | (2016.01) |
| ***H02P 21/18*** | (2016.01) |
| ***H02P 23/20*** | (2016.01) |
| ***H02P 23/30*** | (2016.01) |

(52) U.S. Cl.

CPC .......... *H02P 23/30* (2016.02); *H02P 21/0017* (2013.01); *H02P 21/0021* (2013.01); *H02P 21/141* (2013.01); *H02P 21/18* (2016.02); *H02P 23/20* (2016.02)

(58) Field of Classification Search

CPC ......... H02P 23/30; H02P 21/18; H02P 27/085

See application file for complete search history.

(56) References Cited

U.S. PATENT DOCUMENTS

| | | | | |
|---|---|---|---|---|
| 6,300,741 | B1 | 10/2001 | Okuyama | |
| 6,515,442 | B1 * | 2/2003 | Okubo | G05B 19/19 318/632 |
| 2016/0226409 | A1 * | 8/2016 | Ogawa | H02P 27/085 |

FOREIGN PATENT DOCUMENTS

| | | |
|---|---|---|
| JP | H9-298900 | 11/1997 |
| JP | 2001-238499 | 8/2001 |
| JP | 3641526 | 4/2005 |
| JP | 4238652 | 3/2009 |
| JP | 4760020 | 8/2011 |

* cited by examiner

*Primary Examiner* — Cortez M Cook

(74) *Attorney, Agent, or Firm* — SHIPWAY IP

(57) ABSTRACT

A power conversion device includes: power conversion circuitry configured to supply drive power to an induction motor; and control circuitry configured to: generate a torque command; correct the torque command, in response to determining that a magnitude of a primary frequency of the induction motor is less than a lower limit level, so that the magnitude of the primary frequency approaches the lower limit level; and control the power conversion circuitry to supply the drive power so that the induction motor generates a torque corresponding to the torque command.

20 Claims, 19 Drawing Sheets

POWER CONVERSION DEVICE AND CONTROL METHOD

CROSS-REFERENCE TO RELATED APPLICATIONS

This application is based upon and claims the benefit of priority from Japanese Patent Application No. 2023-087185, filed on May 26, 2023, the entire contents of which are incorporated herein by reference.

BACKGROUND

Field

The present disclosure relates to a power conversion device and a control method.

Description of the Related Art

Japanese Patent No. 4238652 discloses a control device including a flux observer that calculates a current estimation value and a magnetic flux estimation value based on a mathematical model of an induction motor driven by an inverter.

SUMMARY

Disclosed herein is a power conversion device. The power conversion device may include: power conversion circuitry configured to supply drive power to an induction motor; and control circuitry configured to: generate a torque command; correct the torque command, in response to determining that a magnitude of a primary frequency of the induction motor is less than a lower limit level, so that the magnitude of the primary frequency approaches the lower limit level; and control the power conversion circuitry to supply the drive power so that the induction motor generates a torque corresponding to the torque command.

Additionally, another power conversion device is disclosed herein. The power conversion device may include: power conversion circuitry configured to supply drive power to an induction motor; one or more processing devices; and one or more memory devices including computer program code configured to cause the one or more processing devices to: determine, in response to determining that a magnitude of a primary frequency of the induction motor approaches zero, a target frequency having an inverse sign to a sign of the primary frequency; correct a magnetic flux command so as to reduce a deviation between the target frequency and the primary frequency; and control the power conversion circuitry so that the induction motor generates a secondary magnetic flux corresponding to the magnetic flux command.

Additionally, a method of controlling power conversion circuitry is disclosed herein. The power conversion circuitry is configured to supply drive power to an induction motor. The method may include: generating a torque command for the induction motor; correcting the torque command, when a magnitude of a primary frequency of the induction motor falls below a lower limit level that is predetermined, so that the magnitude of the primary frequency approaches the lower limit level; and controlling the power conversion circuitry so that the induction motor generates a torque corresponding to the torque command

DETAILED DESCRIPTION

In the following description, with reference to the drawings, the same reference numbers are assigned to the same components or to similar components having the same function, and overlapping description is omitted.

Drive System

Figure 1:
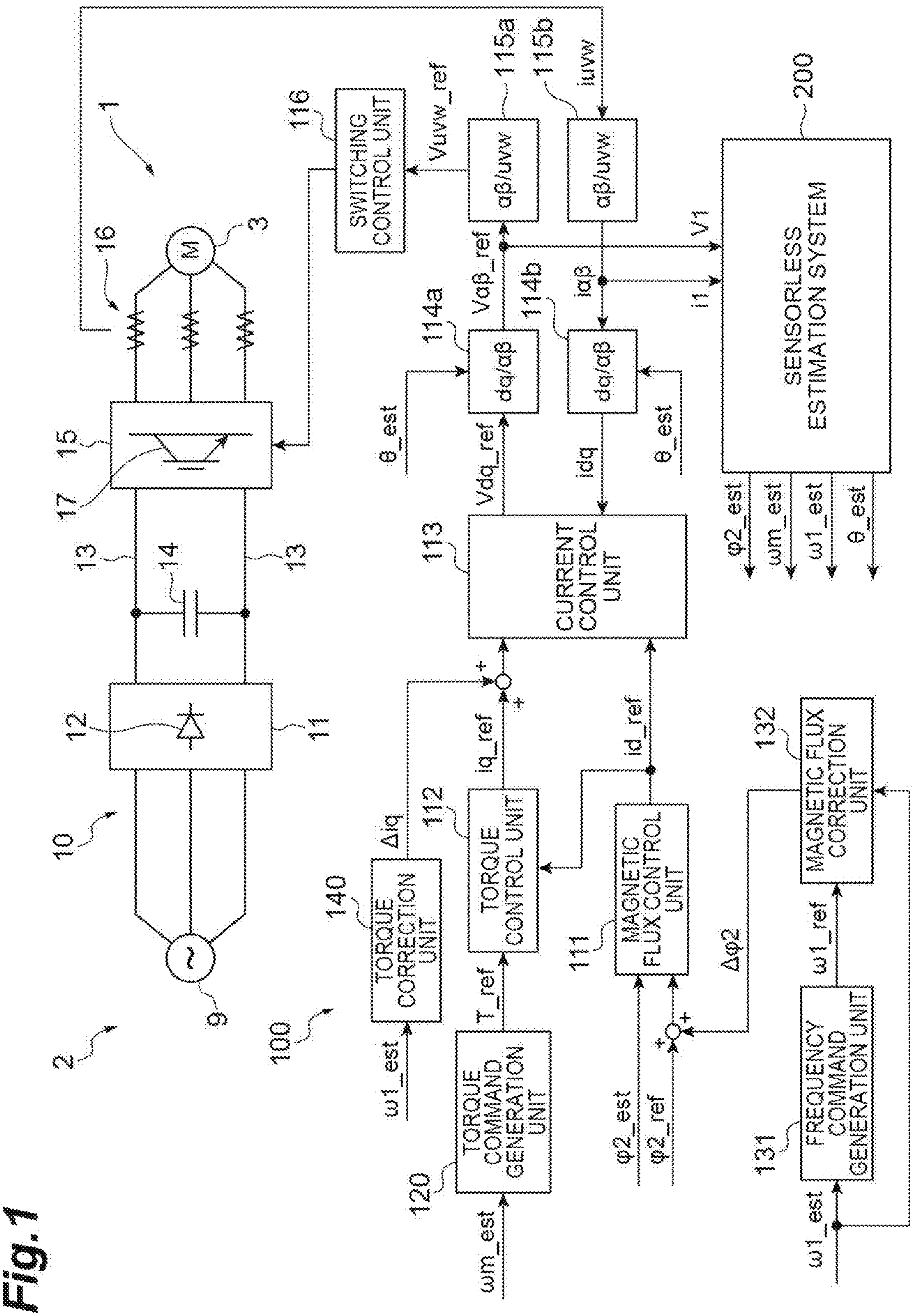
FIG. 1 is a schematic diagram illustrating an example configuration of a power conversion device.

A drive system 1 illustrated in FIG. 1 is a system for driving an object to be driven by the power of an electric motor 3. The drive system 1 includes the electric motor 3 and a power conversion device 2. The electric motor 3 is an induction motor.

The power conversion device 2 supplies electric power (driving power) to the electric motor 3 for generating a driving force for driving load of the motor 3. For example, the power conversion device 2 includes power conversion circuitry 10 and control circuitry 100. The power conversion circuitry 10 performs power conversion between an AC power supply 9 (for example, a power system) and the electric motor 3. For example, the power conversion circuitry 10 converts primary side power supplied from the AC power supply 9 into secondary side power and supplies the secondary side power to the electric motor 3. The primary side power may be DC power or may be AC power. The secondary side power is AC power. Hereinafter, an example configuration of the power conversion circuitry 10 in a case where the primary side power and the secondary side power are three phase alternating current will be described.

The power conversion circuitry 10 includes rectifier circuitry 11, a capacitor 14, inverter circuitry 15, and a current sensor 16. The rectifier circuitry 11 is, for example, a diode bridge circuit including a plurality of diodes 12, converts primary side power into DC power, and outputs the DC power to a DC bus 13. The capacitor 14 smooths the DC voltage of the DC bus 13.

The inverter circuitry 15 performs power conversion between the DC power of the DC bus 13 and secondary side power. For example, the inverter circuitry 15 converts DC power into the secondary side power and supplies the secondary side power to the electric motor 3 in a power motoring state, and converts secondary side power generated by the electric motor 3 into DC power and returns it to the DC bus 13 in a regenerating state. For example, the inverter circuitry 15 includes a plurality of switching devices 17 and performs power conversion between the primary power (for example, the DC power) and the secondary side power by turning on and off the plurality of switching devices 17.

The switching device 17 is, for example, a power MOSFET (Metal Oxide Semiconductor Field Effect Transistor), an IGBT (Insulated Gate Bipolar Transistor), or the like, and switches on and off in accordance with a gate drive signal.

The current sensor 16 detects the current flowing between the inverter circuitry 15 and the electric motor 3 (hereinafter referred to as "secondary side current"). For example, the current sensor 16 may be configured to detect currents of all phases (the U phase, the V phase, and the W phase) of the secondary side power or may be configured to detect currents of any two phases of the secondary side power. Since the sum of the currents of the U phase, the V phase, and the W phase is zero as long as the zero-phase current does not occur, information on the currents of all the phases is obtained even when the currents of two phases are detected.

The configuration of the power conversion circuitry 10 described above is merely an example. The configuration of the power conversion circuitry 10 can be modified in any manner as long as the primary side power can be converted into the secondary side power and supplied to the electric motor 3. For example, the rectifier circuitry 11 may be a PWM converter circuit that converts AC power into DC power. The power conversion circuitry 10 may be a matrix converter circuit that performs bi-directional power conversion between the primary side power and the secondary side power without going through DC conversion. If the primary side power is DC power, the power conversion circuitry 10 may not include the rectifier circuitry 11.

The control circuitry 100 controls the power conversion circuitry 10 to convert power between the DC power of the DC bus 13 and the secondary side power. For example, the control circuitry 100 estimates the state of the electric motor 3 without using a sensor, and controls the power conversion circuitry 10 so as to supply, to the electric motor 3, secondary side power for causing the state of the electric motor 3 to follow a target state based on the estimation result. Examples of the state of the electric motor 3 include a secondary magnetic flux of the electric motor 3 (a magnetic flux that the secondary current generates), the rotation speed of the electric motor 3 (rotational speed of a rotor), and the like. Hereinafter, estimating the state of the electric motor 3 without using a sensor is referred to as "sensorless estimation".

In the sensorless estimation, the error increases as a magnitude of the primary frequency (a frequency of the current supplied to the primary winding) in the electric motor 3 decreases. Accordingly, in order to avoid a state where the primary frequency stagnates near zero (hereinafter, referred to as a "zero frequency state"), the control circuitry 100 may be configured to perform: generating a torque command; correcting, when the primary frequency magnitude of the electric motor 3 falls below a lower limit level that is predetermined, the torque command to bring the primary frequency magnitude closer to the lower limit level; and controlling the power conversion circuitry 10 so that the electric motor 3 generates a torque corresponding to the torque command.

Since the torque is corrected so as to maintain the magnitude of the primary frequency in the vicinity of the lower limit level, an excessive influence of the error of the sensorless estimation may be avoided. Since the correction target is the torque command, the primary frequency can be maintained near the lower limit level in both cases where the control target is the rotational speed of the electric motor 3 and where the control target is the torque. Accordingly, the sensorless control of the electric motor 3 may be stabilized.

The control circuitry 100 may be configured to perform: determining, when the magnitude of the primary frequency of the electric motor 3 approaches zero, a target frequency with a sign opposite to the sign of the primary frequency to avoid a zero frequency state; correcting a magnetic flux command to reduce a deviation between the target frequency and the primary frequency; and controlling the power conversion circuitry 10 so that the induction motor generates a secondary magnetic flux corresponding to the magnetic flux command.

Since the time during which the magnitude of the primary frequency remains in the vicinity of zero is shortened, the influence of the error of the sensorless estimation may be avoided from becoming excessive.

The control circuitry 100 may estimate both the rotational speed of the electric motor 3 and the secondary magnetic flux of the electric motor 3 in the sensorless estimation. The control circuitry 100 may repeatedly perform: calculating the secondary magnetic flux and an estimated current based on a relationship among a primary voltage (a voltage applied to the primary winding), a primary current (a current flowing through the primary winding), the rotational speed, and secondary magnetic flux in the electric motor 3, a model (for example, a set of model parameters) of the electric motor 3, and a current error that is a difference between the estimated current based on the model and the primary current; and estimating the rotational speed based on a calculation of the current error based on a calculation result of the estimated current.

The calculation results of the secondary magnetic flux and the estimated current and the estimation result of the rotational speed converge while affecting each other. The stability of the control of the electric motor 3 based on the estimation result may be improved by both preventing divergence of the estimation result of the rotational speed and preventing oscillation of the estimation result of the rotational speed. Accordingly, the control circuitry 100 may set a gain of the current error in the above relationship so as to achieve both preventing the divergence of the estimation result of the rotational speed and preventing oscillation of the estimation result of the rotational speed, and may calculate the secondary magnetic flux and the estimated current based on the above relationship including the set gain.

For example, in the setting of the gain, the control circuitry 100 changes a gain profile that defines the relationship among the gain, the model, and the rotational speed so as to satisfy the stability condition of the estimation result of the rotational speed within a range that satisfies the stability condition in accordance with a change in a pole of a flux observer, and calculates the gain based on the gain profile. Accordingly, the gain profile is changed in accordance with a change in the pole of the flux observer within a range satisfying the stability condition. In a fixed gain profile, it is difficult to maintain the pole of the flux observer in a range suitable for both preventing the divergence and preventing the oscillation of the calculation result of the secondary magnetic flux and the estimated current. For this reason, even if the gain profile is determined so as to satisfy the stability condition, the oscillation of the estimation result of the rotational speed may not be prevented due to the oscillation of the estimation result by the flux observer. By changing the gain profile in accordance with the change in the pole of the flux observer while satisfying the stability condition, both preventing divergence of the estimation result of the rotational speed and preventing oscillation of the rotational speed may be achieved.

For example, the control circuitry 100 includes a magnetic flux control unit 111, a torque command generation unit 120, a torque control unit 112, a current control unit 113, coordinate conversion units 114*a*, 114*b*, phase number conversion units 115*a*, 115*b*, a switching control unit 116, and a sensorless estimation system 200 as functional components (hereinafter referred to as "functional block").

The magnetic flux control unit 111 is configured to control the power conversion circuitry 10 so that the electric motor 3 generates a secondary magnetic flux corresponding to the magnetic flux command. For example, the magnetic flux control unit 111 performs a proportional operation, a proportional-integral operation, or a proportional-integral-derivative operation on a deviation between a secondary magnetic flux command vector Φ2_ref and an estimated secondary magnetic flux vector Φ2_est (flux deviation) to calculate a d-axis current command id_ref for reducing the flux deviation. As described below, the estimated secondary magnetic flux vector Φ2_est is estimated by the sensorless estimation system 200.

The torque command generation unit 120 is configured to generate a torque command. For example, the torque command generation unit 120 generates a torque command so that the rotational speed of the rotor of the electric motor 3 follows a target rotational speed. For example, the torque command generation unit 120 performs a proportional operation, a proportional-integral operation, or a proportional-integral-derivative operation on a deviation between a target rotational speed ωm_ref and a rotational speed ωm_est (speed deviation) to calculate a torque command T_ref for reducing the speed deviation. As described later, the rotational speed ωm_est is calculated by the sensorless estimation system 200.

The torque control unit 112 is configured to control the power conversion circuitry 10 so that the electric motor 3 generates a torque corresponding to the torque command T_ref. For example, the torque control unit 112 calculates iq_ref for causing the electric motor 3 to generate torque corresponding to the torque command T_ref based on the d-axis current command id_ref calculated by the magnetic flux control unit 111.

The current control unit 113 is configured to control the power conversion circuitry 10 to supply a current corresponding to the d-axis current command id_ref calculated by the magnetic flux control unit 111 and iq_ref calculated by the torque control unit 112 to the electric motor 3. For example, the current control unit 113 calculates a voltage command vector Vdq_ref that is a voltage vector to be applied to the electric motor 3 in order to cause a current corresponding to the d-axis current command id_ref and iq_ref to flow represented in a rotating coordinate system aiming to rotate together with the secondary magnetic flux (dq coordinate system).

The coordinate conversion unit 114*a* is configured to convert the voltage command vector Vdq_ref into a voltage command vector Vαβ_ref expressed in a fixed coordinate system based on a rotating angle (or a phase) of the rotating coordinate system. For example, the coordinate conversion unit 114*a* converts the voltage command vector Vdq_ref into the voltage command vector Vαβ_ref based on an estimated rotating angle θ_est of the rotating coordinate system. As described below, the estimated rotating angle θ_est is calculated by the sensorless estimation system 200.

The phase number conversion unit 115*a* is configured to convert the voltage command vector Vαβ_ref into a voltage command Vuvw_ref with respect to three phases of U phase, V phase, and W phase by two-phase to three-phase conversion. The switching control unit 116 switches on and off the plurality of switching devices 17 of the inverter circuitry 15 so as to apply a voltage corresponding to the voltage command Vuvw_ref to each of the U phase, the V phase, and the W phase. Since the voltage command Vuvw_ref is calculated based on the estimated secondary magnetic flux vector Φ2_est and the rotational speed ωm_est, the switching control unit 116 controls the inverter circuitry 15 based on the estimated secondary magnetic flux vector Φ2_est and the rotational speed ωm_est.

As described above, currents corresponding to the d-axis current command id_ref and iq_ref are supplied to the electric motor 3. Accordingly, calculating, by the magnetic flux control unit 111, the d-axis current command id_ref for reducing the flux deviation corresponds to controlling the power conversion circuitry 10 so as to reduce the flux deviation. Calculating, by the torque control unit 112, iq_ref for causing the electric motor 3 to generate a torque corresponding to the torque command T_ref corresponds to controlling the power conversion circuitry 10 to cause the electric motor 3 to generate a torque corresponding to the torque command T_ref.

The current supplied to the electric motor 3 is detected by the current sensor 16. The phase number conversion unit 115*b* is configured to convert the detection result of the current sensor 16 into a current vector iαβ represented in the above-described fixed coordinate system. The coordinate conversion unit 114*b* is configured to convert the current vector iαβ into a current vector idq represented in the rotating coordinate system described above. The conversion of the current vector iαβ to the current vector idq is also performed based on the estimated rotating angle θ_est.

The current vector idq is used to calculate the voltage command vector Vdq_ref in the current control unit 113 as described above. For example, the current control unit 113 performs a proportional operation, a proportional-integral operation, a proportional-integral-derivative operation, or the like on a deviation between the d-axis current command id_ref and iq_ref and the current vector idq (current deviation) to calculate the voltage command vector Vdq_ref for reducing the current deviation.

The sensorless estimation system 200 is configured to estimate a secondary magnetic flux of the electric motor 3, a rotational speed of the electric motor 3, a primary frequency of the electric motor 3, and the rotating angle of the rotating coordinate system based on the primary voltage applied to the electric motor 3, the primary current flowing in the electric motor 3, and a model of the electric motor 3. For example, the sensorless estimation system 200 calculates the estimated secondary magnetic flux vector Φ2_est, the rotational speed ωm_est, an estimated primary frequency ω1_est, and the estimated rotating angle θ_est based on a primary voltage V1, a primary current i1, and the model of the electric motor 3.

In the illustrated example, the sensorless estimation system 200 acquires information of the voltage command vector Vαβ_ref as information of the primary voltage V1 and acquires information of the current vector iαβ as information of the primary current i1, but the information is not limited thereto. The sensorless estimation system 200 may acquire information of the voltage command vector Vdq_ref as the information of the primary voltage V1 information, and may acquire information of the voltage command Vuvw_ref as information of the primary voltage V1. The power conversion circuitry 10 may further include a voltage sensor (see FIG. 10) that detects a voltage applied to the electric motor 3 by the inverter circuitry 15, and the sensorless estimation system 200 may acquire a detection result of the voltage sensor as information of the primary voltage V1. The sensorless estimation system 200 may acquire information of the current vector idq as the information of the primary current i1, and may acquire information of iuvw as the information of the primary current i1.

The model of the electric motor 3 is data in which a plurality of numerical values representing the characteristics of the electric motor 3 are collected. The model of the electric motor 3 includes primary resistance, primary inductance, secondary resistance, secondary inductance, mutual inductance, and the like of the electric motor 3. The torque command generation unit 120 is configured to generate the torque command T_ref so as to reduce a deviation between the target rotational speed ωm_ref and the rotational speed ωm_est estimated by the sensorless estimation system 200. Accordingly, based on the model of the electric motor 3, the torque control unit 112 controls the power conversion circuitry 10 so that the electric motor 3 generates a torque corresponding to the torque command T_ref. The magnetic flux control unit 111 is configured to control the power conversion circuitry 10 so as to reduce the deviation between the secondary magnetic flux command vector Φ2_ref and the estimated secondary magnetic flux vector Φ2_est estimated by the sensorless estimation system 200. Accordingly, based on the model of the electric motor 3, the magnetic flux control unit 111 controls the power conversion circuitry 10 so that the electric motor 3 generates a secondary magnetic flux corresponding to the secondary magnetic flux command vector Φ2_ref.

The control circuitry 100 repeatedly executes calculation of the current vector iαβ by the phase number conversion unit 115*b*, calculation of the current vector idq by the coordinate conversion unit 114*b*, calculation of the estimated secondary magnetic flux vector Φ2_est, the rotational speed ωm_est, the estimated primary frequency ω1_est, and the estimated rotating angle θ_est by the sensorless estimation system 200, calculation of the d-axis current command id_ref by the magnetic flux control unit 111, calculation of the torque command T_ref by the torque command generation unit 120, calculation of iq_ref by the torque control unit 112, calculation of the voltage command vector Vdq_ref by the current control unit 113, calculation of the voltage command vector Vαβ_ref by the coordinate conversion unit 114*a*, calculation of the voltage command Vuvw_ref by the phase number conversion unit 115*a*, and control of the inverter circuitry 15 by the switching control unit 116 at a predetermined control cycle. The switching control unit 116 controls the inverter circuitry 15 based on the estimated secondary magnetic flux vector Φ2_est and the rotational speed ωm_est.

The control circuitry 100 may further include a target frequency determination unit 131 and a magnetic flux correction unit 132 to avoid the zero frequency state. The target frequency determination unit 131 is configured to determine a target frequency having a sign opposite to the sign of the primary frequency when the magnitude of the primary frequency approaches zero. For example, the target frequency determination unit 131 generates a target primary frequency ω1_ref with a sign opposite to the sign of the estimated primary frequency ω1_est when the magnitude of the estimated primary frequency ω1_est estimated by the sensorless estimation system 200 approaches zero. The magnetic flux correction unit 132 is configured to correct the secondary magnetic flux command vector Φ2_ref to reduce a deviation between the target primary frequency ω1_ref and the estimated primary frequency ω1_est (frequency deviation). For example, the magnetic flux correction unit 132 performs a proportional operation, a proportional-integral operation, a proportional-integral-derivative operation, or the like on the frequency deviation to calculate a magnetic flux correction value (or vector) ΔΦ2 for reducing the frequency deviation, and adds it to the secondary magnetic flux command vector Φ2_ref. The magnetic flux control unit 111 controls the power conversion circuitry 10 so that the electric motor 3 generates a secondary magnetic flux that corresponds to the secondary magnetic flux command vector Φ2_ref corrected by the addition of the magnetic flux correction value ΔΦ2.

The target frequency determination unit 131 may determine, when the magnitude of the primary frequency decreases to a first lower limit level, a target frequency having a sign opposite to the sign of the primary frequency and a magnitude greater than the first lower limit level. Due to the hysteresis effect, frequent reversing of the sign of the primary frequency may be reduced.

The target frequency determination unit 131 may determine, when the magnitude of the primary frequency according to the magnetic flux command before correction decreases to a second lower limit level greater than the first lower limit level, a target frequency having the same sign as the sign of the primary frequency and the same magnitude as the magnitude of the second lower limit level, and may reverse the sign of the target frequency when the magnitude of the primary frequency according to the magnetic flux command corrected by the magnetic flux correction unit 132 based on the target frequency decreases to the first lower limit level. Since there is a case where the primary frequency starts to increase while the magnitude of the primary frequency is controlled aiming to maintain at the second lower limit level, the frequency of reversing the sign of the primary frequency may further be reduced.

Figure 2:
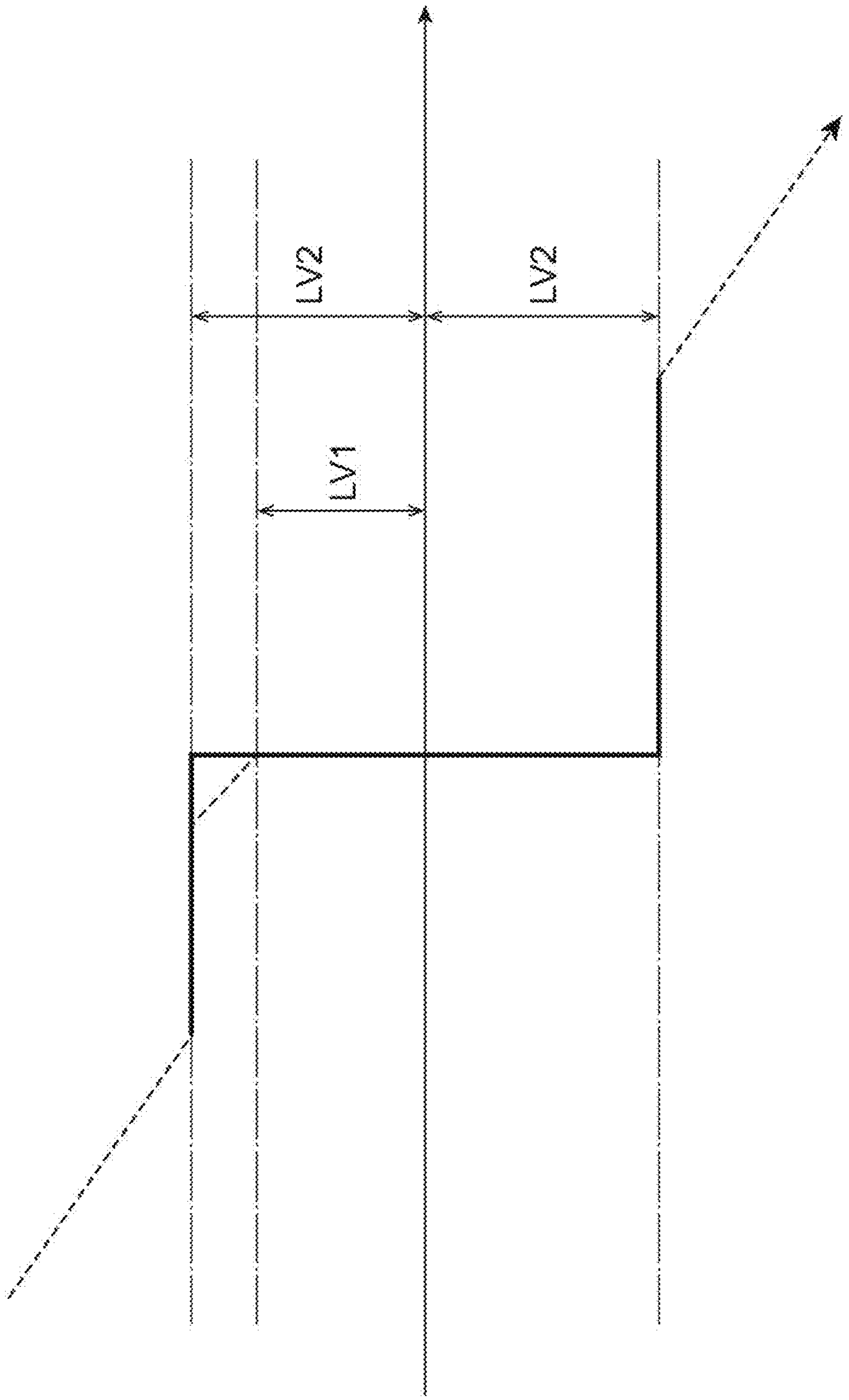
FIG. 2 is a graph schematically illustrating a temporal change of a primary frequency.

FIG. 2 is a graph schematically illustrating a temporal change of the primary frequency. In the drawing, a broken line represents a temporal change of the estimated primary frequency ω1_est, and a thick solid line represents a temporal change of the target primary frequency ω1_ref. As illustrated in FIG. 2, when the estimated primary frequency ω1_est decreases to a second lower limit level LV2, the target frequency determination unit 131 determines the target primary frequency ω1_ref having the same sign as the sign of the estimated primary frequency ω1_est and the same magnitude as the magnitude of the second lower limit level LV2. The magnetic flux correction unit 132 corrects the secondary magnetic flux command vector Φ2_ref to maintain the estimated primary frequency ω1_est in the vicinity of the target primary frequency ω1_ref that has the same magnitude as the magnitude of the second lower limit level LV2. Accordingly, when the estimated primary frequency ω1_est starts to increase due to an increase in the torque command T_ref or the like while the estimated primary frequency ω1_est is maintained at the second lower limit level LV2, the sign of the target primary frequency ω1_ref according to the target frequency determination unit 131 is not reversed. On the other hand, in a case where the estimated primary frequency ω1_est cannot be maintained at the second lower limit level LV2 by correction of the estimated secondary magnetic flux vector Φ2_est due to a further decrease in the torque command T_ref or the like, the estimated primary frequency ω1_est starts to decrease again. When the estimated primary frequency ω1_est decreases to a first lower limit level LV1, the target frequency determination unit 131 determines the target primary frequency ω1_ref having a sign opposite to the sign of the estimated primary frequency ω1_est and a magnitude that is same as the magnitude of the second lower limit level LV2. For example, the target frequency determination unit 131 reverses the sign of the target primary frequency ω1_ref while keeping the magnitude of the target primary frequency ω1_ref at the second lower limit level LV2. The target frequency determination unit 131 and the magnetic flux correction unit 132 repeat the above process until the magnitude of the estimated primary frequency ω1_est begins to be greater than the magnitude of the second lower limit level LV2 in either the positive or negative direction.

Thus, when the target frequency determination unit 131 and the magnetic flux correction unit 132 correct the secondary magnetic flux command vector Φ2_ref, the torque control unit 112 controls the power conversion circuitry 10 to cancel the change in torque due to the correction of the secondary magnetic flux command vector Φ2_ref. Accordingly, the influence of the correction of the secondary magnetic flux command vector Φ2_ref on the operation of the electric motor 3 is reduced.

Returning to FIG. 1, the control circuitry 100 may further include a torque correction unit 140 instead of the target frequency determination unit 131 and the magnetic flux correction unit 132. The torque correction unit 140 corrects, when the magnitude of the primary frequency of the electric motor 3 falls below a predetermined lower limit level, the torque command so that the magnitude of the primary frequency approaches the lower limit level. For example, the torque correction unit 140 accelerates the rotor of the electric motor 3 in the present rotating direction to correct the torque command so that the primary frequency approaches the lower limit level.

As an example of correcting the torque command T_ref, the torque correction unit 140 may correct iq_ref to reduce the deviation between the lower limit level and the estimated primary frequency ω1_est (frequency deviation). Since iq_ref is generated so as to cause the torque to correspond to the torque command T_ref, correcting iq_ref is included in correcting the torque command T_ref. For example, the torque correction unit 140 performs a proportional operation, a proportional-integral operation, or a proportional-integral-derivative operation on the frequency deviation to calculate a current correction value Δiq for reducing the frequency deviation, and adds the current correction value Δiq to iq_ref. The current control unit 113 controls the power conversion circuitry 10 to supply a current corresponding to the corrected iq_ref to the electric motor 3. The torque correction unit 140 may calculate a torque correction value to reduce the frequency deviation and add the torque correction value to the torque command T_ref. The torque control unit 112 controls the power conversion circuitry 10 so that the electric motor 3 generates a torque corresponding to the corrected the torque command T_ref.

Figure 3:
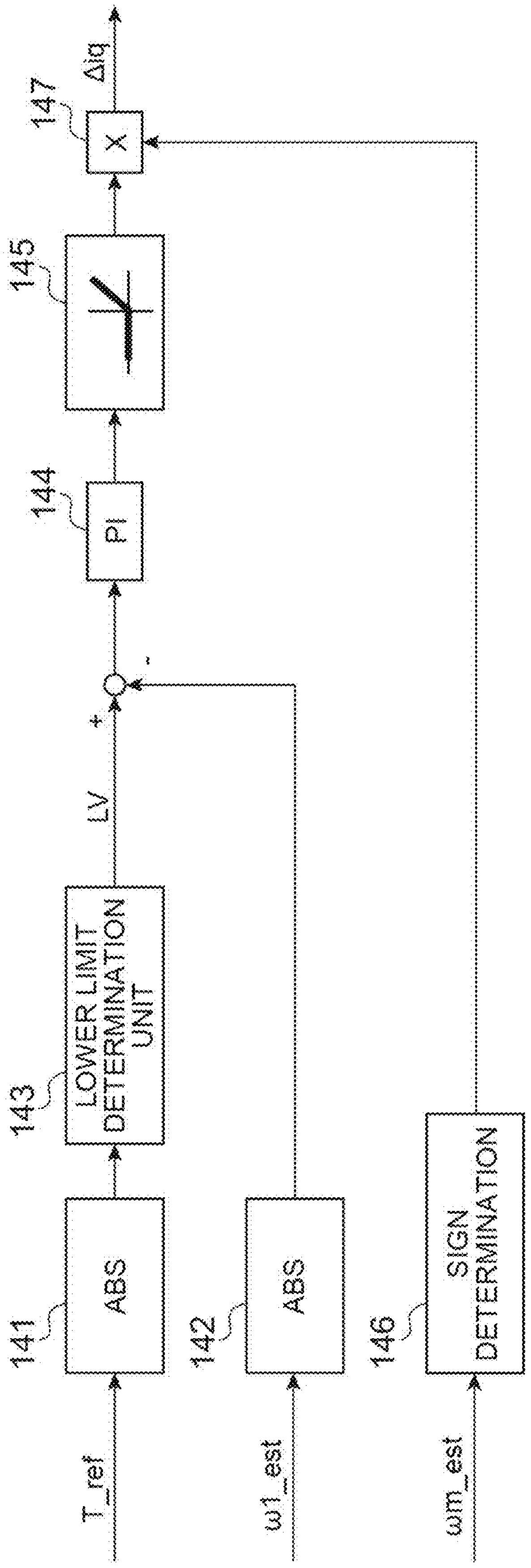
FIG. 3 is a block diagram illustrating an example configuration of a torque correction unit.

FIG. 3 is a block diagram illustrating an example configuration of the torque correction unit 140. As illustrated in FIG. 3, the torque correction unit 140 includes an absolute value calculation unit 141, an absolute value calculation unit 142, a lower limit determination unit 143, a PI calculation unit 144, a limiter 145, a sign determination unit 146, and a multiplication unit 147. The absolute value calculation unit 141 is configured to calculate the absolute value of the torque command T_ref. The absolute value calculation unit 142 is configured to calculate the absolute value of the estimated primary frequency ω1_est.

The lower limit determination unit 143 is configured to determine a lower limit level LV based on a lower limit profile predetermined to represent a relationship between the torque command T_ref and a lower limit level, and the torque command T_ref before correction. The effect of an error of the sensorless estimation due to the estimated primary frequency ω1_est approaching zero depends on the magnitude of the torque. By changing the lower limit level LV in accordance with the torque command T_ref before correction, a difference in the influence of the error of sensorless estimation due to a difference in torque may be reduced.

For example, as the torque increases, the effect of the error of the sensorless estimation on the motion of the electric motor 3 tends to increase. Correspondingly, the lower limit profile may be defined such that the lower limit level increases in response to an increase in the torque command T_ref. This approach can mitigate an increase in the influence of sensorless estimation error as the torque increases.

The lower limit profile may be defined so as to limit the lower limit level to a predetermined limit value or less. For example, the lower limit profile may be defined such that an increase in the lower limit level in accordance with an increase in the torque command T_ref is limited by the limit value. When a target rotational speed is set to the rotational speed of the rotor of the electric motor 3, the deviation of the rotational speed from the target rotational speed may be prevented.

The lower limit determination unit 143 may store the lower limit profile as a function, or may store the lower limit profile as a discrete table data.

The PI calculation unit 144 is configured to perform a proportional operation, a proportional-integral operation, or a proportional-integral-derivative operation on the deviation between the lower limit level LV and the absolute value of the estimated primary frequency ω1_est, and calculates the current correction value Δiq for reducing the frequency deviation. The limiter 145 is configured to limit the current correction value Δiq to zero or more. For example, when the current correction value Δiq is a negative value, the limiter 145 corrects the size of the current correction value Δiq to zero. As a result, when the current correction value Δiq is a negative value (when the size of the estimated primary frequency ω1_est exceeds the size of the lower limit level LV), the torque correction unit 140 does not function.

The sign determination unit 146 is configured to determine the sign of the rotational speed ωm_est. The multiplication unit 147 is configured to calculate the current correction value Δiq by giving the current correction value Δiq that has passed through the limiter 145 the sign determined by the sign determination unit 146. By giving the sign determined by the sign determination unit 146, a sign for accelerating the rotor of the electric motor 3 in the direction of rotation is assigned to the current correction value Δiq.

Figure 4:
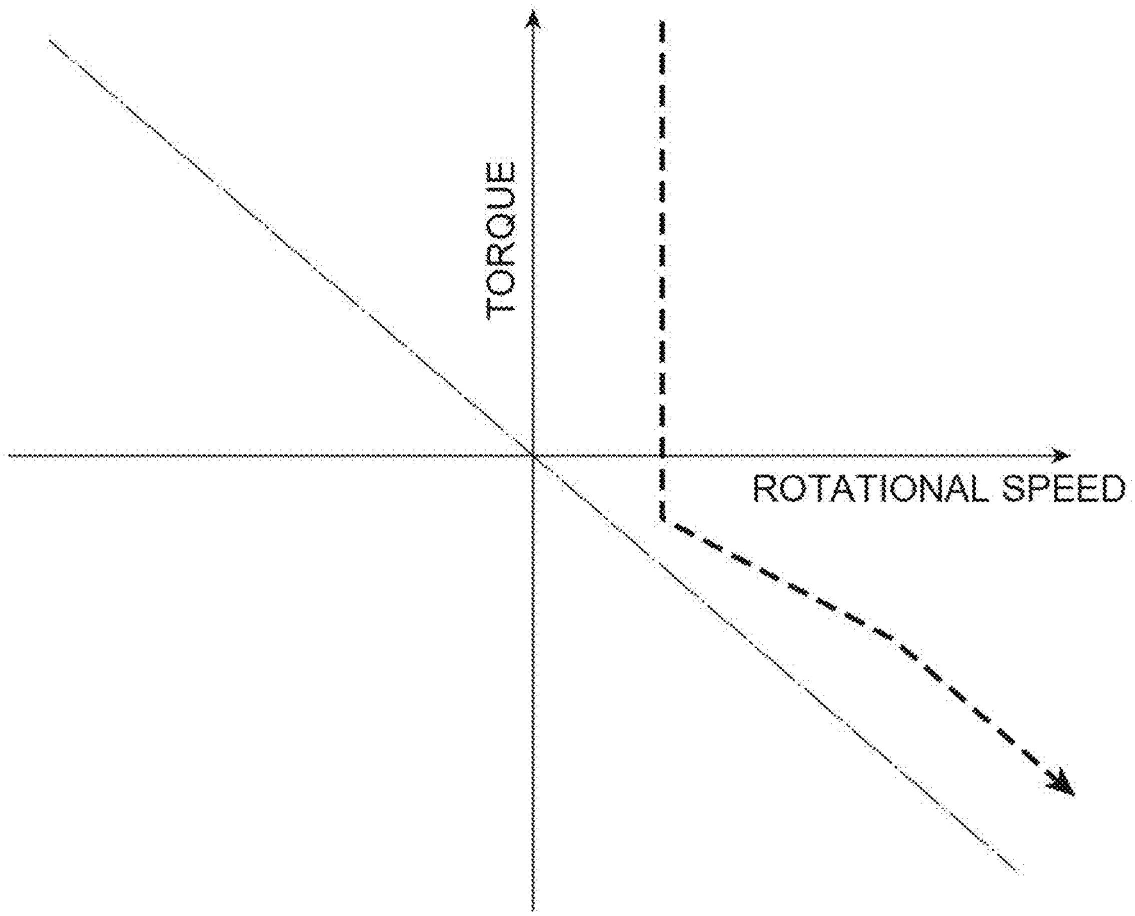
FIG. 4 is a graph illustrating a relationship between a rotational speed and a torque of a rotor of an induction motor.

FIG. 4 is a graph illustrating a relationship between a rotational speed of the rotor of the electric motor 3 and a torque. The horizontal axis represents the rotational speed, and the vertical axis represents the torque. When the rotational speed and the torque are located in the first quadrant or the third quadrant, the electric motor 3 is in the motoring state in which the rotation direction and the acting direction of the torque coincide with each other. When the rotational speed and torque are located in the second quadrant or the fourth quadrant, the electric motor 3 is in the regenerating state in which the torque acts in a direction opposite to the rotational direction. The dash-dotted line in the figure represents the relationship between the rotational speed and the torque when the primary frequency is zero. Hereinafter, this line is referred to as a “zero line”.

The dashed line in the figure illustrates an example torque correction performed by the torque correction unit 140 when the torque increases toward negative direction and the primary frequency approaches zero in a state where the rotational speed is maintained constant by the torque command generation unit 120 and the torque control unit 112. As described above, when the torque decreases beyond zero level until the primary frequency falls below the lower limit level, the torque correction unit 140 corrects the torque command to keep the primary frequency at or close to the lower limit level. In response to the torque further varies toward negative direction, the rotational speed and the torque shift departing from the zero line in accordance with an increase in the lower limit level according to the lower limit profile in which the lower limit level increases in accordance with an increase in the magnitude of the torque command T_ref. In response to the torque further varying toward the negative direction after the lower limit level reaches the limit value, the rotational speed and the torque shift parallel to the zero line.

When the torque correction unit 140 corrects the torque command, since the electric motor 3 is accelerated in the rotation direction, a magnitude of the deviation between the rotational speed ωm_est and the target rotational speed ωm_ref is increased. When the torque command generation unit 120 calculates the torque command T_ref based on an integral of a deviation between the target rotational speed ωm_ref and the rotational speed ωm_est (speed deviation), a magnitude of the calculation result of the torque command T_ref by the torque command generation unit 120 increases as long as the deviation remains. As a result, the correction of the torque command by the torque correction unit 140 may possibly be canceled.

Figure 5:
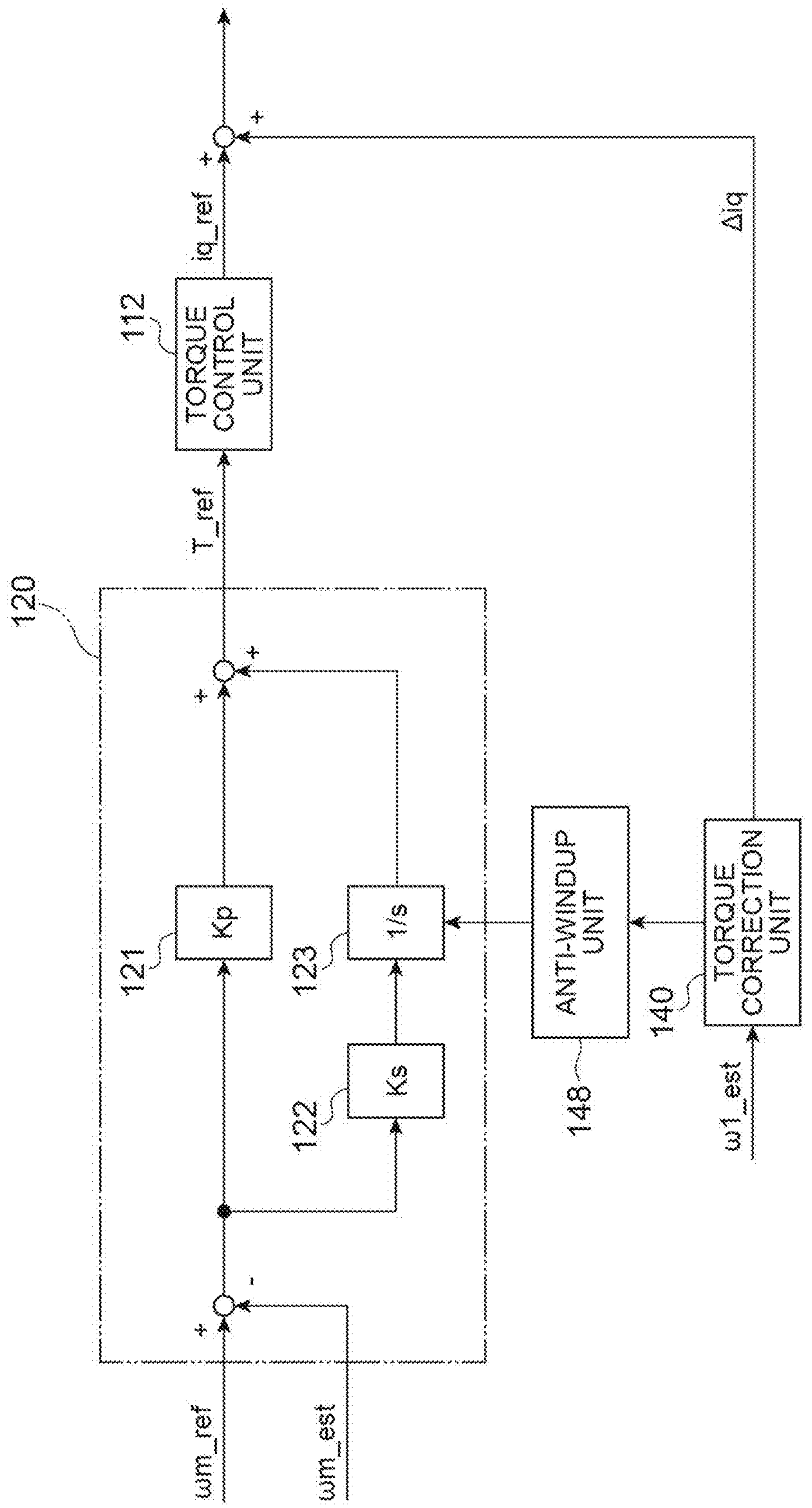
FIG. 5 is a block diagram illustrating a modification of control circuitry.

On the other hand, the torque correction unit 140 may be configured to stop integrating the speed deviation by the torque command generation unit 120 when correcting the torque command. For example, as illustrated in FIG. 5, the torque command generation unit 120 includes a proportional calculation unit 121, a proportional calculation unit 122, and an integration calculation unit 123. The proportional calculation unit 121 multiplies the speed deviation by a proportional gain Kp. The proportional calculation unit 122 multiplies the speed deviation by an integration gain Ks, and the integration calculation unit 123 integrates the speed deviation multiplied by the integration gain Ks. The torque command generation unit 120 calculates the torque command T_ref by adding the multiplication result by the proportional calculation unit 121 and the integration result by the proportional calculation unit 122. Accordingly, the torque command T_ref is generated so as to reduce the multiplication result by the proportional calculation unit 121 and the integration result by the proportional calculation unit 122.

The control circuitry 100 further includes an anti-windup unit 148. The anti-windup unit 148 is configured to stop the integration of the deviation by the integration calculation unit 123 when the correction of the torque command based on the lower limit level is performed by the torque correction unit 140. For example, the anti-windup unit 148 fixes the integration result by the integration calculation unit 123 to zero.

Figure 6:
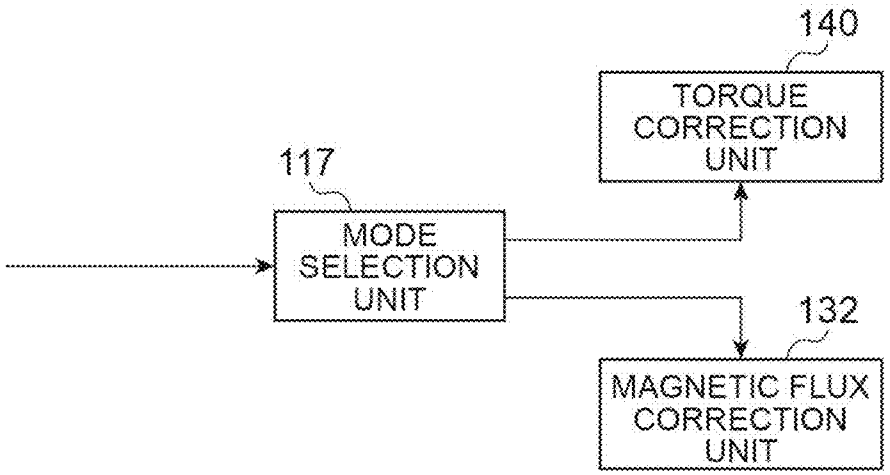
FIG. 6 is a block diagram illustrating another modification of control circuitry.

The control circuitry 100 may include both the target frequency determination unit 131 and the magnetic flux correction unit 132 and the torque correction unit 140. As illustrated in FIG. 6, the control circuitry 100 may further include a mode selection unit 117. The mode selection unit 117 is configured to select, as a mode for avoiding the zero frequency state, either a first mode in which the torque correction unit 140 corrects the torque command or a second mode in which the magnetic flux correction unit 132 changes the magnetic flux command.

For example, in a case where the rotational speed of the rotor of the electric motor 3 can be deviated from the target rotational speed, the influence of the error of the sensorless estimation can be reduced by using the first mode. In a case where the rotational speed of the rotor of the electric motor 3 cannot be deviated from the target rotational speed, the influence of the error of the sensorless estimation can be reduced by using the second mode instead of the first mode.

The mode selection unit 117 may be configured to select either the first mode or the second mode based on a user setting. By allowing users to switch between the first mode and the second mode, the device configuration can be simplified.

The mode selection unit 117 may select either the first mode or the second mode based on whether there is a constraint condition for the rotational speed of the rotor of the electric motor 3. Since one of the first mode and the second mode is automatically selected by the control circuitry 100, convenience can be improved.

For example, the mode selection unit 117 determines whether the constraint condition exists based on whether the generation of the torque command T_ref by the torque command generation unit 120 is performed based on a constraint condition for the rotational speed. Since the target rotational speed ωm_ref is an example of a constraint condition for the rotational speed, it is determined that there is a constraint condition when the torque command generation unit 120 calculates the torque command T_ref based on the deviation between the target rotational speed ωm_ref and the rotational speed ωm_est as described above. If it is determined that there is a constraint condition, the mode selection unit 117 selects the second mode.

The constraint condition may not be limited to the target rotational speed ωm_ref. For example, if the torque command T_ref is generated so that the rotational speed does not fall below a predetermined lower limit speed, the mode selection unit 117 selects the second mode because the lower limit speed is the constraint condition.

Figure 7:
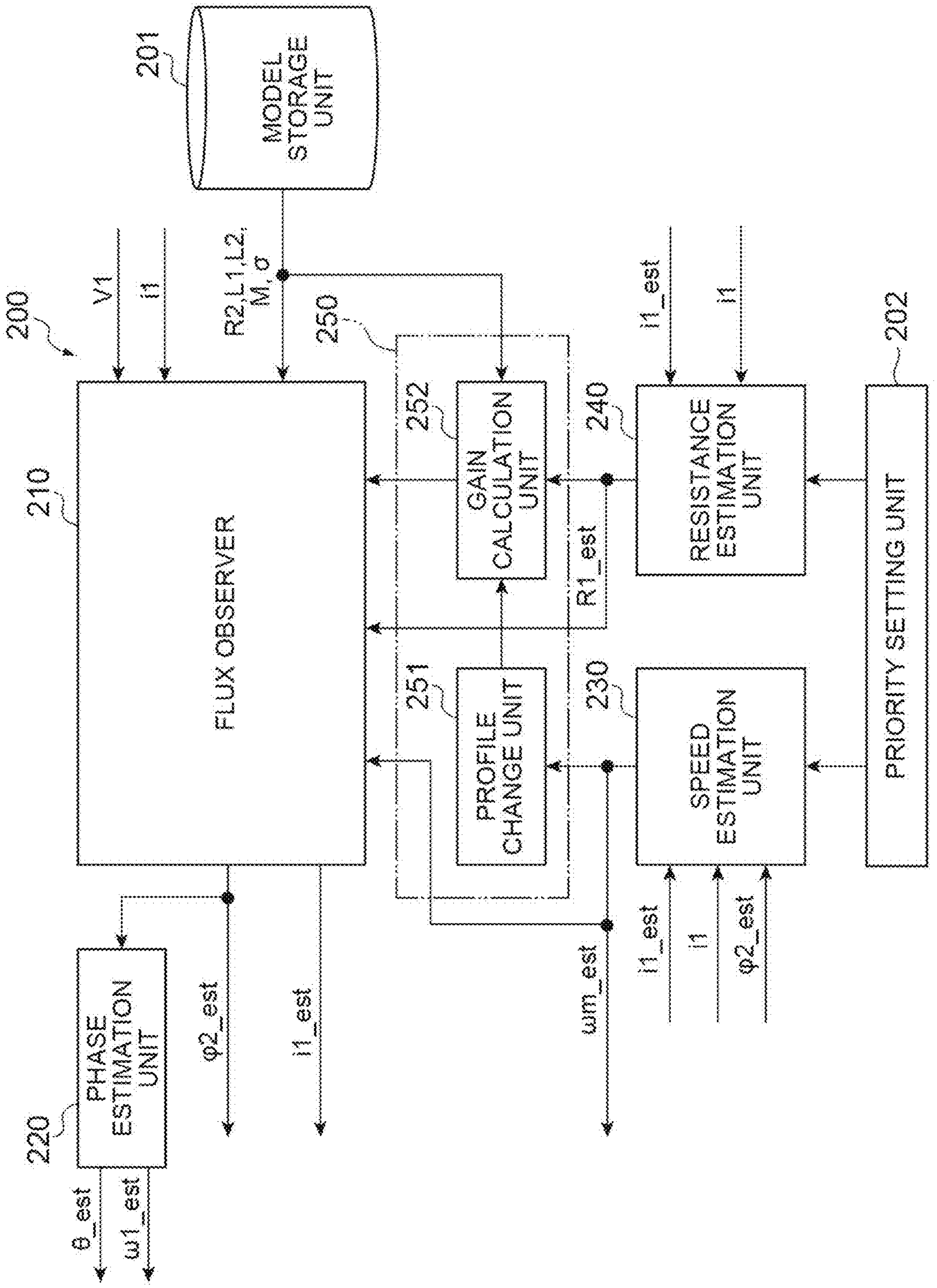
FIG. 7 is a block diagram illustrating an example configuration of a sensorless estimation system.

FIG. 7 is a block diagram illustrating an example configuration of the sensorless estimation system 200. As illustrated in FIG. 7, the sensorless estimation system 200 includes a model storage unit 201, a flux observer 210, an angle estimation unit 220, a speed estimation unit 230, a resistance estimation unit 240, and a gain setting unit 250 as functional blocks. The model storage unit 201 stores a model of the electric motor 3. As described above, the model of the electric motor 3 includes the primary resistance, the primary inductance, the secondary resistance, the secondary inductance, the mutual inductance, and the like of the electric motor 3. The primary resistance of the electric motor 3 can be used as an initial value in adaptive identification described later.

The flux observer 210 is configured to calculate the estimated secondary magnetic flux vector Φ2_est and the estimated current i1_est based on a relationship among the primary voltage V1, the primary current i1, the rotational speed ωm_est, and the estimated secondary magnetic flux vector Φ2_est in the electric motor 3, the model of the electric motor 3, and a current error that is a difference between the estimated current i1_est based on the model of the electric motor 3 and the primary current i1. For example, the flux observer 210 calculates the estimated secondary magnetic flux vector Φ2_est and the estimated current i1_est based on the relationship represented by the following expressions (1) to (8).

[Expression 1]

$$\frac{d}{dt}\begin{bmatrix} \text{i1\_est} \\ \phi\text{2\_est} \end{bmatrix} = \begin{bmatrix} \text{A11\_est} & \text{A12\_est} \\ \text{A21\_est} & -\epsilon\cdot\text{A12\_est} \end{bmatrix}\begin{bmatrix} \text{i1\_est} \\ \phi\text{2\_est} \end{bmatrix} + \begin{bmatrix} B1 \\ 0 \end{bmatrix} V1 + G[\text{i1\_est} - i1] \tag{1}$$

$$\text{A11\_est} = -\frac{\text{R1\_est} + R2\cdot M^2/L2^2}{\sigma\cdot L1}\begin{bmatrix} 1 & 0 \\ 0 & 1 \end{bmatrix} \tag{2}$$

$$\text{A12\_est} = \frac{M}{\sigma\cdot L1\cdot L2}\left(\frac{R2}{L2}\begin{bmatrix} 1 & 0 \\ 0 & 1 \end{bmatrix} - \omega\text{m\_est}\begin{bmatrix} 0 & -1 \\ 1 & 0 \end{bmatrix}\right) \tag{3}$$

$$\text{A21\_est} = M\cdot\frac{R2}{L2}\begin{bmatrix} 1 & 0 \\ 0 & 1 \end{bmatrix} \tag{4}$$

$$B1 = \begin{bmatrix} \frac{1}{\sigma\cdot L1}\begin{bmatrix} 1 & 0 \\ 0 & 1 \end{bmatrix} \\ 0 \end{bmatrix} \tag{5}$$

$$\epsilon = \frac{\sigma\cdot L1\cdot L2}{M} \tag{6}$$

$$\sigma = 1 - \frac{M^2}{L1\cdot L2} \tag{7}$$

$$G = \begin{bmatrix} G1\begin{bmatrix} 1 & 0 \\ 0 & 1 \end{bmatrix} + G2\begin{bmatrix} 0 & -1 \\ 1 & 0 \end{bmatrix} \\ G3\begin{bmatrix} 1 & 0 \\ 0 & 1 \end{bmatrix} + G4\begin{bmatrix} 0 & -1 \\ 1 & 0 \end{bmatrix} \end{bmatrix} \tag{8}$$

i1_est: estimated current vector
Φ2_est: estimated secondary magnetic flux vector
R1_est: estimated primary resistance
i1: primary current vector
V1: primary voltage vector
R2: estimated secondary resistance
L1: primary inductance
L2: secondary inductance
M: mutual inductance The angle estimation unit 220 is configured to calculate the estimated rotating angle θ_est based on the calculation result of the estimated secondary magnetic flux vector Φ2_est, and to calculate the estimated primary frequency ω1_est by differentiating the estimated rotating angle θ_est.

The speed estimation unit 230 is configured to calculate the rotational speed ωm_est (estimate the rotational speed) based on the estimated secondary magnetic flux vector Φ2_est and the calculation result of the current error based on the calculation result of the estimated current i1_est. For example, the speed estimation unit 230 calculates the rotational speed ωm_est by performing a proportional-integral operation on an outer product of the estimated secondary magnetic flux vector Φ2_est and the current error.

The resistance estimation unit 240 is configured to calculate an estimated primary resistance R1_est of the electric motor 3 (estimate the primary resistance) based on the calculation result of the estimated current i1_est and the calculation result of the current error based on the calculation result of the estimated current i1_est. For example, the resistance estimation unit 240 calculates the estimated primary resistance R1_est by integrating the inner product of the estimated current i1_est and the current error.

For example, the speed estimation unit 230 and the resistance estimation unit 240 calculate the rotational speed ωm_est and the estimated primary resistance R1_est based on the following expressions (9) to (13).

[Expression 2]

$$\omega\text{m\_est} = K\omega p\cdot\varepsilon\omega + K\omega i\int\varepsilon\omega\cdot dt \tag{9}$$

$$\text{R1\_est} = Kri\int\varepsilon r\cdot dt \tag{10}$$

$$\varepsilon\omega = \phi\text{2\_est}\times\text{i1\_err} \tag{11}$$

$$\varepsilon r = -\text{i1\_est}\cdot\text{i1\_err} \tag{12}$$

$$\text{i1\_err} = i1 - \text{i1\_est} \tag{13}$$

Kωp, Kωi: speed identification gain
Kri: primary resistance identification gain

In the next control cycle, the flux observer 210 estimates the estimated secondary magnetic flux vector Φ2_est and the estimated current i1_est based on the rotational speed ωm_est calculated by the speed estimation unit 230 and the model of the electric motor 3 including the estimated primary resistance R1_est calculated by the resistance estimation unit 240. For example, the rotational speed ωm_est and the estimated primary resistance R1_est are substituted into the above expressions (1) to (8) in the next control cycle. As described above, the calculation of the estimated secondary magnetic flux vector Φ2_est and the estimated current i1_est by the flux observer 210 and the calculation of the rotational speed ωm_est and the estimated primary resistance R1_est by the speed estimation unit 230 and the resistance estimation unit 240 are repeated in the control cycle, whereby each of the rotational speed ωm_est and the estimated primary resistance R1_est is estimated (adaptively identified) so that the current error approaches zero.

In order to improve the stability of the control of the electric motor 3 based on the estimation result, it is desired to prevent both the divergence of the rotational speed ωm_est and the oscillation of the rotational speed ωm_est. The gain setting unit 250 is configured to set the gain of the current error in the relationship between the primary voltage V1, the primary current i1, the rotational speed ωm_est, and the estimated secondary magnetic flux vector Φ2_est, the model of the electric motor 3, and the current error so as to achieve both preventing the divergence of the rotational speed ωm_est and preventing the oscillation of the rotational speed ωm_est. For example, the gain setting unit 250 sets gains G1 to G4 in the expressions (1) to (8).

The gain setting unit 250 includes a profile change unit 251 and a gain calculation unit 252. The profile change unit 251 is configured to change a gain profile for defining the relationship among the gains G1 to G4, the model of the electric motor 3, and the rotational speed ωm_est so as to satisfy the stability condition of the rotational speed ωm_est in a range satisfying the stability condition of the rotational speed ωm_est in accordance with the change of the pole of the flux observer 210. For example, the profile change unit 251 holds a plurality of gain profiles, and sets the gain profile used to calculate the gains G1 to G4 based on the plurality of gain profiles in accordance with a change in the pole of the flux observer 210. Setting the gain profile based on the plurality of gain profiles includes setting the gain profile by selecting any one of the plurality of gain profiles or combining any two or more of the plurality of gain profiles. The profile change unit 251 may store a plurality of gain profiles as a function, or may hold a gain profile as a discrete table data.

The gain calculation unit 252 is configured to calculate the gains G1 to G4 based on the gain profile set by the profile change unit 251. When the gain profile is a function, the gain calculation unit 252 calculates the gains G1 to G4 by substituting the model of the electric motor 3, the rotational speed ωm_est, and the like into the gain profile. When the gain profile is a table, the gain calculation unit 252 extracts, from the gain profile, the gains G1 to G4 corresponding to the model of the electric motor 3, the rotational speed ωm_est, and the like.

The stability condition of the rotational speed ωm_est corresponds to a condition in which the rotational speed ωm_est converges without diverging. Examples of the stability condition of the rotational speed ωm_est include a stability condition based on Popov's hyperstability theory. The stability condition of the rotational speed ωm_est based on the Popov's hyperstability theory is expressed by the following expressions (14) and (15), for example, as described in Somboon Sangwongwanich et al. "A Unified Speed Estimation Design Framework for Sensorless AC Motor Drives Based on Positive-Real Property", IEEE, 2007 and the like.

[Expression 3]

$$\begin{cases} G1 = -x + \dfrac{\mathrm{R1\_est}}{\sigma \cdot L1} + \dfrac{R2}{\sigma \cdot L2} \\ G2 = -y - \omega\mathrm{m\_est} \\ G3 = -\epsilon \cdot G1 - k2\dfrac{R2}{L2} + \dfrac{\mathrm{R1\_est} \cdot L2}{M} \\ G4 = -\epsilon \cdot G2 - k2 \cdot \omega\mathrm{m\_est} \end{cases} \tag{14}$$

$$\begin{cases} x > 0 \\ k2 > 0 \end{cases} \tag{15}$$

By setting the gains G1 to G4 to satisfy the expressions (14) and (15), the divergence of the rotational speed ωm_est is theoretically prevented regardless of the operation state of the electric motor 3. For example, regardless of whether the rotational speed and the torque are located in any of the first quadrant to the fourth quadrant (see FIG. 4), divergence of the rotational speed ωm_est is avoided.

The rotational speed ωm_est is prone to diverge in a low speed range. Accordingly, the profile change unit 251 sets the gain profile so as to satisfy the stability conditions of the expressions (14) and (15) at least in the low speed range.

The flux observer 210 includes a plurality of poles. The plurality of poles vary in response to the rotational speed of the electric motor 3. For example, the position of each of the plurality of poles on the complex plane changes in accordance with the rotational speed of the electric motor 3. The profile change unit 251 may set the gain profile so that a plurality of poles match each other on the real-axis when the rotational speed ωm_est is zero. In the low speed range, both preventing the divergence of the estimation result of the rotational speed and preventing the oscillation of the rotational speed can be achieved.

For example, the profile change unit 251 sets the gain profile so that the plurality of poles match each other on the real-axis while satisfying the expressions (14) and (15) when the rotational speed ωm_est is zero. For example, the profile change unit 251 sets the gain profile as expressed by the expressions (17) and (18). Hereinafter, the gain profile expressed by the expressions (17) and (18) is referred to as "first gain profile".

[Expression 4]

$$\begin{cases} G1 = -\dfrac{2}{T2} + \dfrac{\mathrm{R1\_est}}{\sigma \cdot L1} + \dfrac{R2}{\sigma \cdot L2} \\ G2 = 0 \\ G3 = -\epsilon \cdot G1 - \epsilon\dfrac{R2}{L2} + \dfrac{\mathrm{R1\_est} \cdot L2}{M} \\ G4 = -\epsilon \cdot \omega\mathrm{m\_est} \end{cases} \tag{17}$$

$$T2 = L2/R2 \tag{18}$$

When the magnitude of an imaginary component of the pole (at least one of the plurality of poles) based on the first gain profile exceeds a predetermined level due to an increase in the rotational speed ωm_est, the profile change unit 251 changes the gain profile from the first gain profile to the second gain profile so that the rate of increase in the magnitude of the imaginary component of the pole in accordance with the increase in the rotational speed ωm_est is slower than that in the first gain profile. The poles of the flux observer can be placed so as to achieve both preventing the divergence of the estimation result by the flux observer and preventing the oscillation of the estimation result by the flux observer.

For example, the profile change unit 251 may switch the first gain profile to a second gain profile represented by the expression (19).

[Expression 5]

$$\begin{cases} G1 = 0 \\ G2 = 0 \\ G3 = -\epsilon\dfrac{R2}{L2} + \dfrac{\mathrm{R1\_est} \cdot L2}{M} \\ G4 = -\epsilon \cdot \omega\mathrm{m\_est} \end{cases} \tag{19}$$

The profile change unit 251 may switch the gain profile from the first gain profile to the second gain profile if the rotational speed ωm_est exceeds a predetermined speed level. Changing the gain profile based on the change of the pole of the flux observer 210 can readily be made. When the rotational speed ωm_est exceeds the speed level, the magnitude of the imaginary component of the pole exceeds the predetermined level corresponding to the speed level. Accordingly, changing the gain profile from the first gain profile to the second gain profile when the rotational speed ωm_est exceeds the predetermined speed level is included in changing the gain profile from the first gain profile to the second gain profile when the magnitude of the imaginary component of the pole exceeds the predetermined level. The profile change unit 251 may change the gain profile from the second gain profile to the first gain profile when the rotational speed ωm_est that was above the speed level falls below the speed level.

The profile change unit 251 may gradually switch the gain profile from the first gain profile to the second gain profile in response to an increase in the rotational speed ωm_est after the rotational speed ωm_est exceeds the speed level. The gain profile being changed is set by combining the first gain profile and the second profile. The smoothness of the movement of the electric motor 3 during the change of the gain profile can be improved.

The profile change unit 251 may switch the gain profile from the second gain profile to a third gain profile so as to maintain the gain at zero regardless of the rotational speed ωm_est when the magnitude of the imaginary component of the pole based on the second gain profile exceeds a predetermined second level due to an increase in the rotational speed ωm_est. The poles of the flux observer can be placed so as to further achieve both preventing the divergence of the estimation result by the flux observer and preventing the oscillation of the estimation result by the flux observer.

The profile change unit 251 may switch the gain profile from the second gain profile to the third gain profile if the rotational speed ωm_est exceeds a predetermined second speed level that is greater than the speed level. Changing to the gain profile based on changes in the pole of the flux observer 210 can be made more readily. When the rotational speed ωm_est exceeds the second speed level, the magnitude of the imaginary component of the pole exceeds a predetermined second level corresponding to the second speed level. Accordingly, changing the gain profile from the second gain profile to the third gain profile when the rotational speed ωm_est exceeds the second speed level is included in changing the gain profile from the second gain profile to the third gain profile when the magnitude of the imaginary component of the pole exceeds the second level. The profile change unit 251 may change the gain profile from the third gain profile to the second gain profile when the rotational speed ωm_est that was above the second speed level falls below the second speed level.

The profile change unit 251 may gradually switch the gain profile from the second gain profile to the third gain profile in response to an increase in the rotational speed ωm_est after the rotational speed ωm_est exceeds the second speed level. The gain profile being changed is set by combining the second gain profile and the third gain profile. The smoothness of the movement of the electric motor 3 may be improved during the change of the gain profile.

Figure 8:
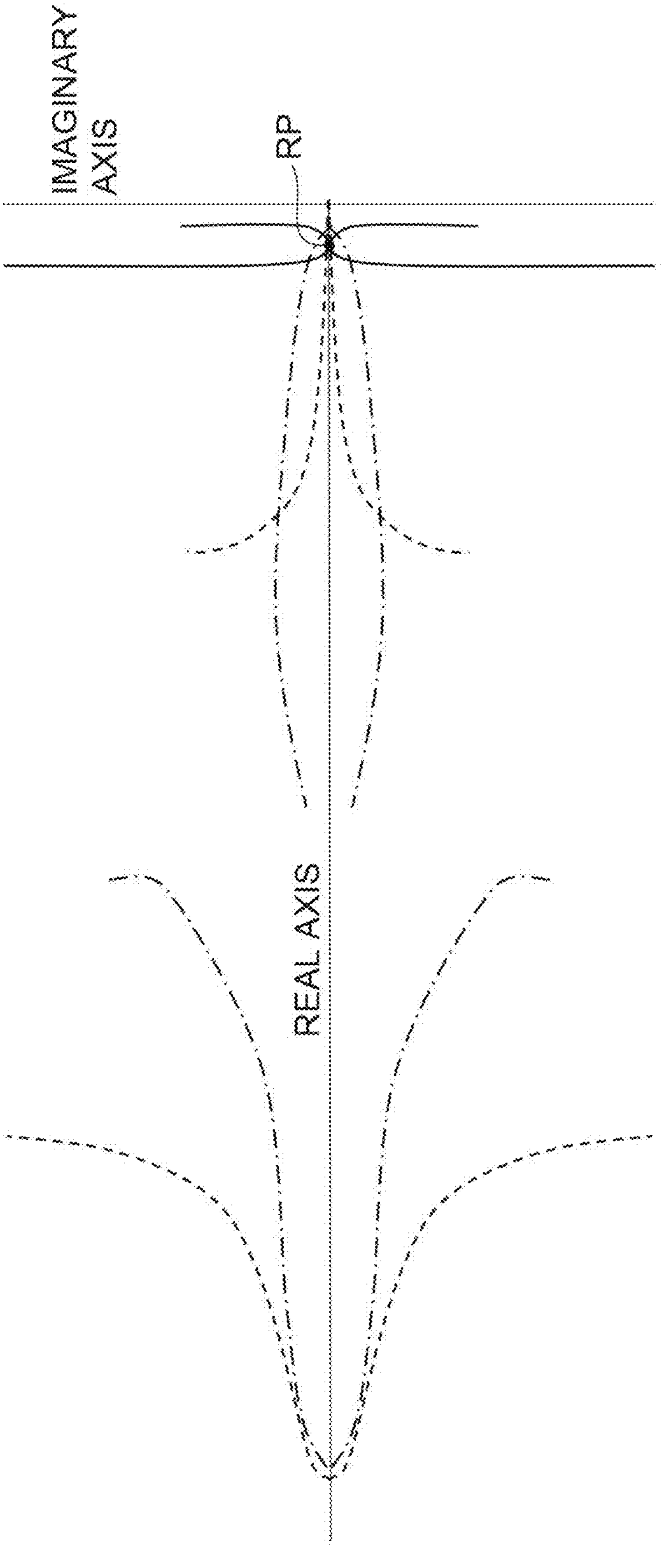
FIG. 8 is a graph illustrating positions of a plurality of poles of a flux observer in a complex plane.

FIG. 8 is a graph illustrating the positions of a plurality of poles of the flux observer 210 on a complex plane, in which the horizontal axis is a real axis and the vertical axis is an imaginary axis. A plot represented by a solid line represents a locus of a plurality of poles when the rotational speed ωm_est gradually increases from zero in the first gain profile. According to the first gain profile, when the rotational speed ωm_est is zero, the plurality of poles become multiple roots at a point RP on the real-axis.

A plot represented by a broken line represents a locus of a plurality of poles when the rotational speed ωm_est gradually increases from zero in the second gain profile. A plot represented by a dash-dotted line represents a locus of a plurality of poles when the rotational speed ωm_est gradually increases from zero in the third gain profile. Under both the second gain profile and the third gain profile, when the rotational speed ωm_est is zero, all of the plurality of poles are located on the real axis.

According to the first gain profile, when the rotational speed ωm_est increases, the plurality of poles move away from each other, and the magnitude of the imaginary component of each of the poles rapidly increases. When the magnitude of the imaginary component increases, the estimation result by the flux observer 210 is prone to oscillate, and thus the rotational speed ωm_est is also prone to oscillate due to the oscillation of the estimation result. This slows the convergence of the rotational speed ωm_est.

The profile change unit 251 switches the gain profile from the first gain profile to the second gain profile in response to the rotational speed ωm_est exceeding the speed level. The speed level is set to, for example, a value corresponding to an intersection point of the plot of the solid line and the plot of the broken line. After the rotational speed ωm_est exceeds the speed level, the positions of the plurality of poles transition from the plot of the solid line to the plot of the broken line, and an increase in the imaginary component is prevented.

The profile change unit 251 switches the gain profile from the second gain profile to the third gain profile in response to the rotational speed ωm_est exceeding the second speed level. The second speed level is set to, for example, a value corresponding to an intersection point of the plot of the broken line and the plot of the dash-dotted line. After the rotational speed ωm_est exceeds the second speed level, the positions of the plurality of poles transition from the plot of the broken line to the plot of the dash-dotted line, and the increase of the imaginary component is further prevented.

As described above, in the system in which each of the rotational speed ωm_est and the estimated primary resistance R1_est is adaptively identified in a simultaneous manner, convergence of each of the rotational speed ωm_est and the estimated primary resistance R1_est may be delayed due to mutual interference between the estimation results of the rotational speed ωm_est and the estimated primary resistance R1_est. Accordingly, as illustrated in FIG. 7, the control circuitry 100 may further include a priority setting unit 202.

The priority setting unit 202 is configured to increase priority of the estimation of the primary resistance by the resistance estimation unit 240 over the estimation of the rotational speed by the speed estimation unit 230 in a period before the rotor of the electric motor 3 starts to rotate compared to a period after the rotor starts to rotate. The priority setting unit 202 may lower the above-described priority when a temporal change in the estimation result of the primary resistance by the resistance estimation unit 240 decreases to a predetermined convergence level. For example, in a period before the rotor of the electric motor 3 starts to rotate, the priority setting unit 202 sets the speed identification gain in the expressions (9) to (13) to be smaller than a normal value and sets the primary resistance identification gain to be larger than the normal value to increase the priority. The priority setting unit 202 returns the speed identification gain to the normal value and returns the primary resistance identification gain to the normal value when a temporal change in the estimation result of the primary resistance by the resistance estimation unit 240 decreases to a predetermined convergence level.

Figure 9:
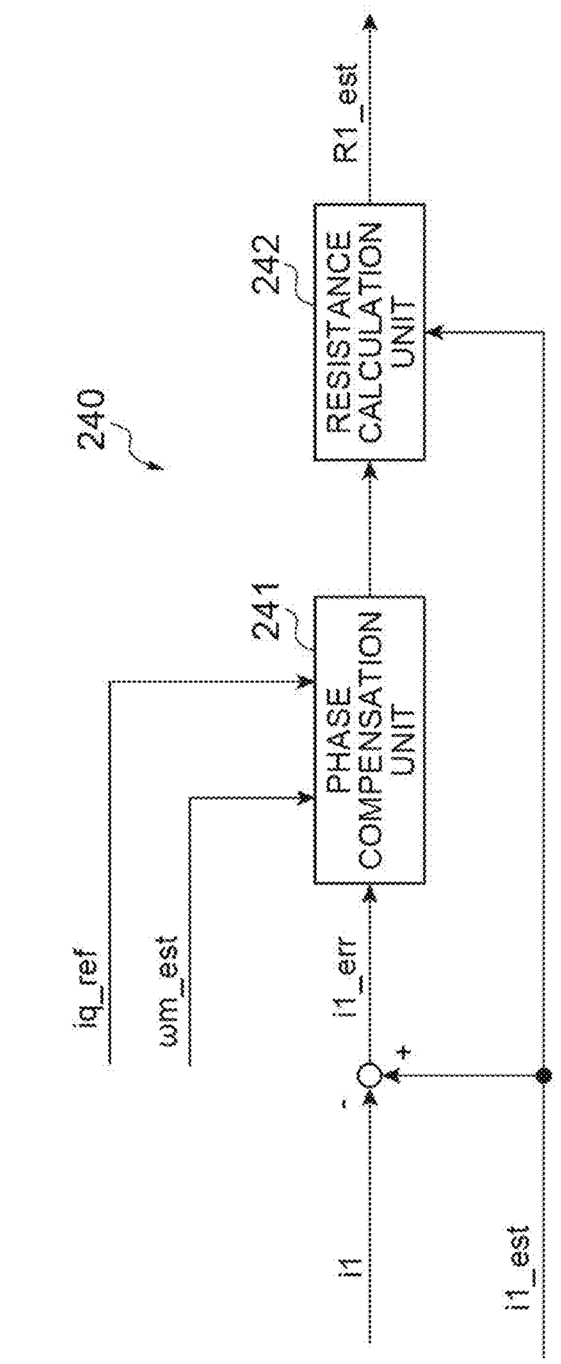
FIG. 9 is a block diagram illustrating still another modification of control circuitry.

As illustrated in FIG. 9, the resistance estimation unit 240 may include a phase compensation unit 241 and a resistance calculation unit 242. The phase compensation unit 241 is configured to determine whether the electric motor 3 is in the regenerative state based on, for example, the q-axis current command iq_ref and the rotational speed ωm_est, and to compensate for the difference in phase between the calculation result of the estimated current i1_est and the calculation result of the current error when the electric motor 3 is in the regenerative state. For example, the phase compensation unit 241 compensates for the difference in phase in the regenerative state so that the difference in phase between the calculation result of the estimated current i1_est and the calculation result of the current error falls within a range of $-\pi/2$ to $\pi/2$. For example, when the electric motor 3 is in a regenerative state, the phase compensation unit 241 advances the phase of the current error so that the phase difference falls within the range of $-\pi/2$ to $\pi/2$. The phase compensation unit 241 may delay the phase of the estimated current i1_est instead of advancing the phase of the current error.

The resistance calculation unit 242 is configured to calculate the estimated primary resistance R1_est based on the calculation result of the phase-difference-compensated estimated current i1_est and the calculation result of the current error. Reliability of the estimation result of the primary resistance in the regenerative state can be improved.

Figure 10:
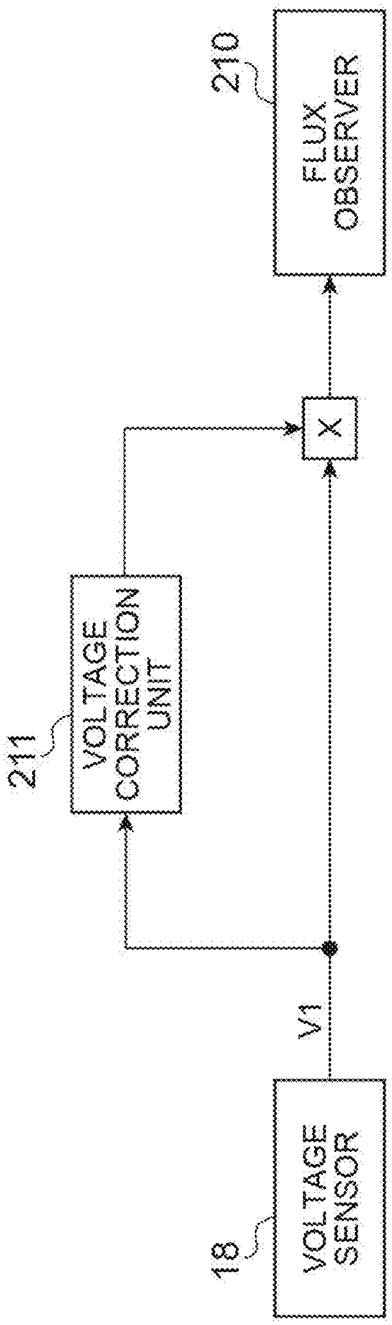
FIG. 10 is a block diagram illustrating still another modification of control circuitry.

As described above, the sensorless estimation system 200 may acquire the detection result by the voltage sensor as the information of the primary voltage V1. For example, as illustrated in FIG. 10, the flux observer 210 may acquire a detection result of a voltage sensor 18 as the information of the primary voltage V1. An error of the detection result by the voltage sensor 18 affects the accuracy of the estimation by the flux observer 210, the speed estimation unit 230, and the resistance estimation unit 240. In order to reduce the influence of the error of the detection result caused by the voltage sensor 18, the sensorless estimation system 200 may further include a voltage correction unit 211.

The voltage correction unit 211 is configured to correct the detection result of the primary voltage based on an error profile representing a relationship between the detection result of the primary voltage V1 by the voltage sensor 18 and the detection error of the primary voltage V1 by the voltage sensor 18. The error profile is defined in advance by an experiment or the like for collecting records in which a measurement result of the primary voltage V1 by a measurement device having higher accuracy than the voltage sensor 18 and a detection result of the primary voltage V1 by the voltage sensor 18 are associated with each other. The flux observer 210 may calculate the estimated the secondary magnetic flux vector Φ2_est and the estimated current i1_est based on the detection result of the primary voltage V1 corrected by the voltage correction unit 211. Reliability of the estimated secondary magnetic flux vector Φ2_est, the estimated current i1_est, the rotational speed ωm_est, and the estimated primary resistance R1_est can be improved.

The voltage correction unit 211 may correct the detection result of the primary voltage V1 by the voltage sensor 18 so as to increase the magnitude of the detection result. For example, the voltage correction unit 211 may add a predetermined value to the detection result of the primary voltage V1. By causing the error of the estimation result of the estimated secondary magnetic flux vector Φ2_est to appear on a phase-delay direction, the regenerative load tolerance may be improved. The voltage correction unit 211 may perform one or both of the correction of the detection result of the primary voltage V1 by the error profile and the correction of increasing the detection result of the primary voltage V1.

The influence of the detection error of the voltage sensor 18, the detection error of the current sensor 16, and the like described above increases as the rotational speed of the electric motor 3 decreases. The detection error of the voltage sensor 18, the detection error of the current sensor 16, and the like are hereinafter collectively referred to as "sensor error". In a situation where the rotational speed of the electric motor 3 is low (including a stopping situation), stalling of the electric motor 3 is likely to occur due to the sensor error. When the stalling occurs, there is a possibility that an overcurrent is supplied to the electric motor 3 by a chain of a case where a current is supplied to the electric motor 3 in a direction in which the current cannot generate a torque corresponding to the torque command T_ref and a case where the torque command T_ref is enlarged a lot because the electric motor 3 does not rotate as intended, and the power conversion device 2 is stopped due to an overcurrent fault.

Figure 11:
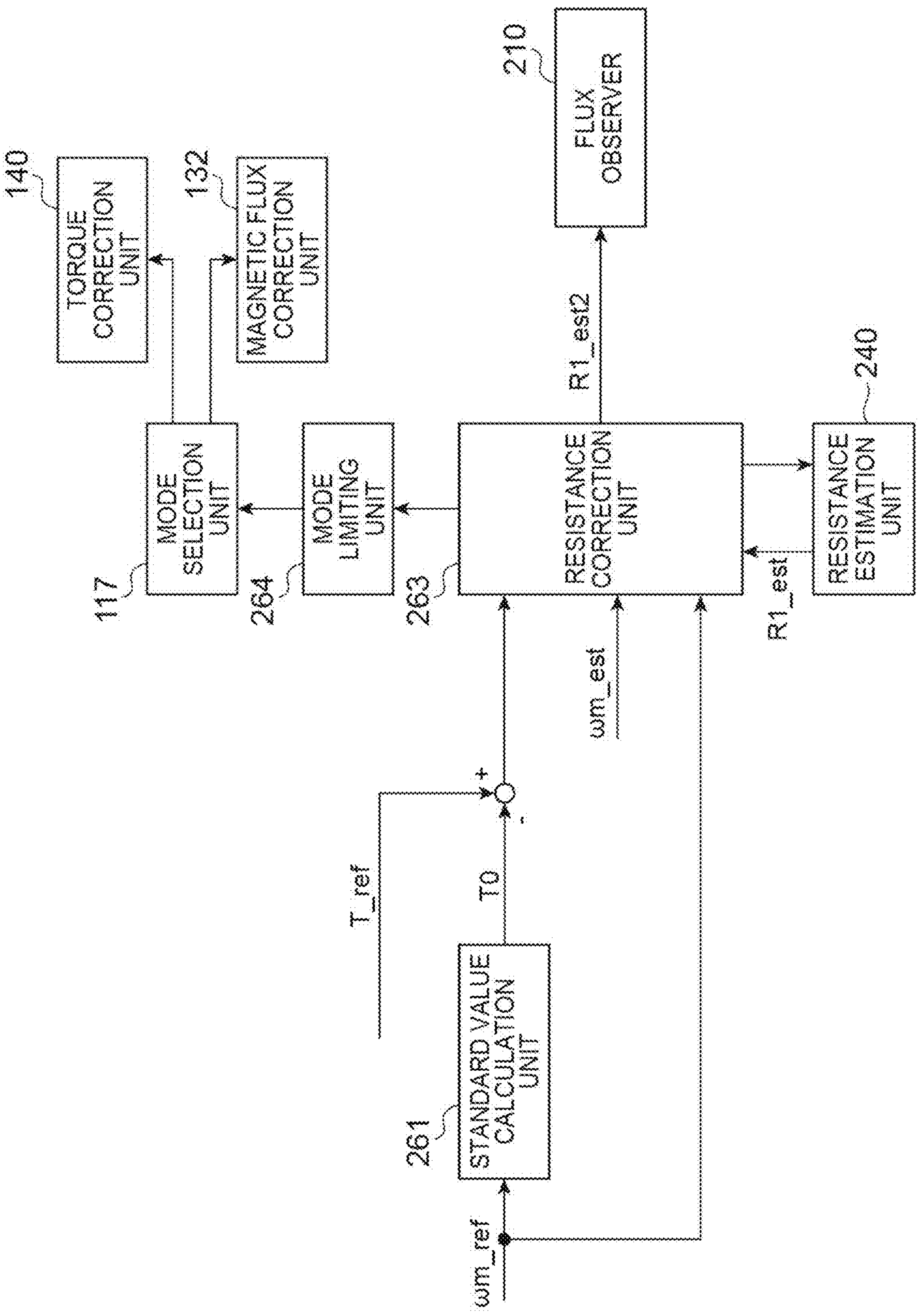
FIG. 11 is a block diagram illustrating still another modification of control circuitry.

To avoid such a situation, the control circuitry 100 may further include a standard value calculation unit 261, a resistance correction unit 263, and a mode limiting unit 264 as illustrated in FIG. 11. The standard value calculation unit 261 is configured to calculate a standard value TO of the torque based on the relationship among the secondary magnetic flux, the rotational speed, and the torque when the primary frequency is zero. For example, the standard value calculation unit 261 calculates the standard value T0 by the following expression (20).

[Expression 6]

$$T0 = -\frac{P \cdot \omega\text{m\_ref} \cdot \Phi\text{2d\_ref}^2}{\text{R2\_est}} \tag{20}$$

P: number of poles

Φ2d_ref: d-axis component of Φ2_ref

The resistance correction unit 263 is configured to correct, when the rotational speed ωm_est is smaller than a predetermined stalling warning level and the deviation between the torque command T_ref and the standard value T0 is larger than an acceptable level, the primary resistance in the model of the electric motor 3 so as to reduce the deviation between the torque command T_ref and the standard value T0. For example, the resistance correction unit 263 corrects the estimated primary resistance R1_est calculated by the resistance estimation unit 240. When the deviation between the torque command T_ref and the standard value T0 is larger than an acceptable level (when the primary resistance is corrected by the resistance correction unit 263), the flux observer 210 calculates the estimated secondary magnetic flux vector Φ2_est and the estimated current i1_est based on the model including the estimated primary resistance R1_est2 corrected by the resistance correction unit 263. When the rotational speed ωm_est is greater than the stalling warning level, the resistance correction unit 263 does not correct the estimated primary resistance R1_est.

The resistance estimation unit 240 may stop the calculation of the estimated primary resistance R1_est until the resistance correction unit 263 determines not to correct the estimated primary resistance R1_est after the estimated primary resistance R1_est is corrected by the resistance correction unit 263. The mode limiting unit 264 causes the mode selection unit 117 to select the first mode when the primary resistance is corrected by the resistance correction unit 263. When the resistance correction unit 263 corrects the estimated primary resistance R1_est, it can be said that the sensor error is large. When the sensor error is large, there is a possibility that the reversing of the sign of the primary frequency fails in the above-described second mode and the stagnation of the primary frequency in the vicinity of zero cannot be avoided as intended. The failure of the reversing of the sign of the primary frequency includes a case where the timing of reversing of the sign of the primary frequency deviates from the target timing. By causing the mode selection unit 117 to select the first mode when the primary resistance is corrected by the resistance correction unit 263, a situation in which the sign of the primary frequency fails to be reversed may be avoided.

The mode limiting unit 264 may cause the mode selection unit 117 to maintain selection of the first mode even after the resistance correction unit 263 stops correcting the estimated primary resistance R1_est.

Figure 12:
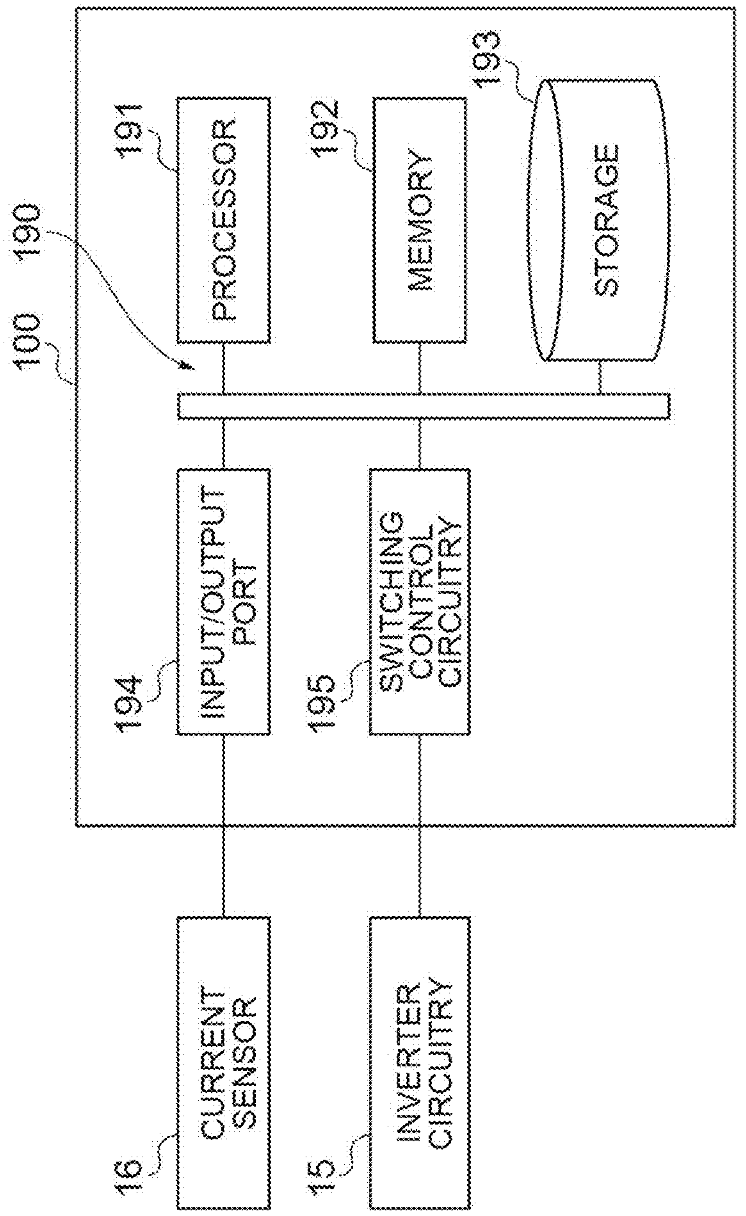
FIG. 12 is a block diagram illustrating an example hardware configuration of control circuitry.

FIG. 12 is a block diagram illustrating an example hardware configuration of the control circuitry 100. As illustrated in FIG. 12, the control circuitry 100 includes circuitry 190. The circuitry 190 includes a processor 191, a memory 192, storage 193, an input/output port 194, and switching control circuitry 195. The storage 193 includes one or more non-volatile memory devices, such as a hard disk drive, read-only memory, or flash memory, and stores a program for causing the control circuitry 100 to control the power conversion circuitry 10. For example, the storage 193 stores a program for configuring each functional block described above in the control circuitry 100.

The memory 192 includes one or more volatile memory devices, such as random-access memory, and temporarily stores a program and the like loaded from the storage 193. The processor 191 includes one or more arithmetic devices such as a central processing unit (CPU) or a graphics processing unit (GPU), and executes a program stored in the memory 192 to cause the control circuitry 100 to configure each functional block. The processor 191 may temporarily store an intermediate data or the like generated in the calculation process in the memory 192.

The input/output port 194 inputs and outputs an electric signal to and from the current sensor 16 or the like in response to requests from the processor 191. The switching control circuitry 195 drives the plurality of switching devices 17 of the inverter circuitry 15 in response to requests from the processor 191.

Control Method

As an example of the control method, a control procedure of the electric motor 3 by the power conversion device 2 will be described. The control circuitry 100 control procedure may include: generating the torque command T_ref for the electric motor 3; correcting the torque command T_ref (for example, correcting iq_ref) to bring the magnitude of the primary frequency closer to the lower limit level when the magnitude of the primary frequency (for example, the magnitude of the estimated primary frequency ω1_est) of the electric motor 3 falls below a predetermined lower limit level; and controlling the power conversion circuitry 10 so that the electric motor 3 generates a torque corresponding to the torque command T_ref.

The control circuitry 100 control procedure may include: generating a target frequency having a sign opposite to the sign of the primary frequency when the magnitude of the primary frequency of the electric motor 3 approaches zero; correcting the magnetic flux command to reduce the deviation between the target frequency and the primary frequency; and controlling the power conversion circuitry so that the induction motor generates a secondary magnetic flux corresponding to the magnetic flux command.

The control procedure performed by the control circuitry 100 may include setting the gain of the current error in relationship among the primary voltage, primary current, rotational speed, and secondary magnetic flux in the electric motor 3, the model of the electric motor 3, and the current error that is the difference between estimated current based on the model of the electric motor 3 and primary current; calculating the secondary magnetic flux and the estimated current by the sensorless estimation system 200 based on the above relationship and gain; estimating rotational speed based on the result of the estimated current calculation; and controlling the power conversion circuitry 10 based on the estimation result of secondary magnetic flux and the estimation result of rotational speed. Setting the gain may include: changing the gain profile that defines the relationship among the gain, the model, and the rotational speed so as to satisfy a stability condition of the rotational speed in response to a change in the pole of the flux observer within a range; and calculating the gain based on the gain profile.

Hereinafter, an example of a control procedure of the electric motor 3, examples of a starting procedure, a stalling avoidance procedure, a selection procedure of a mode for avoiding the zero frequency state, a first mode avoidance procedure, and a second mode avoidance procedure which are performed in association with the control procedure of the electric motor 3 will be described.

Control Procedure of Induction Motor

Figure 13:
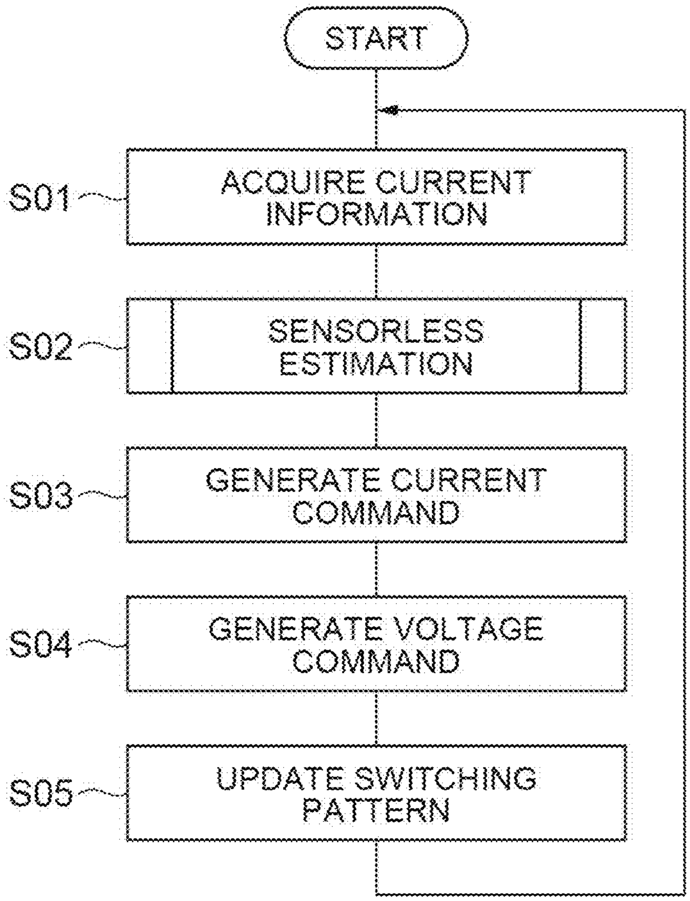
FIG. 13 is a flowchart illustrating an example control procedure of an induction motor.

As illustrated in FIG. 13, the control circuitry 100 performs operations S01, S02, S03, S04, and S05. In the operation S01, the phase number conversion unit 115*b* converts the detection result by the current sensor 16 into the current vector iαβ expressed in a fixed coordinate system. The coordinate conversion unit 114*b* transforms the current vector iαβ into the current vector idq expressed in a rotating coordinate system.

In the operation S02, the sensorless estimation system 200 calculates the estimated secondary magnetic flux vector Φ2_est, the rotational speed ωm_est, the estimated primary frequency ω1_est, and the estimated rotating angle θ_est based on the primary voltage V1 (for example, the voltage command vector Vαβ_ref in the immediately preceding control cycle), the primary current i1, and the model of the electric motor 3.

In the operation S03, the magnetic flux control unit 111 calculates the d-axis current command id_ref to reduce a deviation (flux deviation) between the secondary magnetic flux command vector Φ2_ref and the estimated secondary magnetic flux vector Φ2_est. The torque command generation unit 120 calculates the torque command T_ref for reducing a deviation (speed deviation) between the target rotational speed ωm_ref and the rotational speed ωm_est, and the torque control unit 112 calculates iq_ref for causing the electric motor 3 to generate torque corresponding to the torque command T_ref based on the d-axis current command id_ref.

In the operation S04, the current control unit 113 calculates the voltage command vector Vdq_ref that is a voltage vector to be applied to the electric motor 3 in order to cause a current corresponding to the d-axis current command id_ref and iq_ref expressed in a rotating coordinate system (dq coordinate system). Based on the rotating angle of the rotating coordinate system, the coordinate conversion unit 114*a* converts the voltage command vector Vdq_ref into the voltage command vector Vαβ_ref expressed in the fixed coordinate system. The phase number conversion unit 115*a* converts the voltage command vector Vαβ_ref into the voltage command Vuvw_ref for three phases of U phase, V phase, and W phase by two-phase to three-phase conversion.

In the operation S05, the switching control unit 116 updates the on-off pattern of the plurality of switching devices 17 in the inverter circuitry 15 so that a voltage corresponding to the voltage command Vuvw_ref is applied to each of the U phase, the V phase, and the W phase, and start turning on and off the switching device 17 in the updated on-off pattern. The control circuitry 100 then returns the processing to the operation S01. The control circuitry 100 repeats the above processing at a predetermined control cycle.

Figure 14:
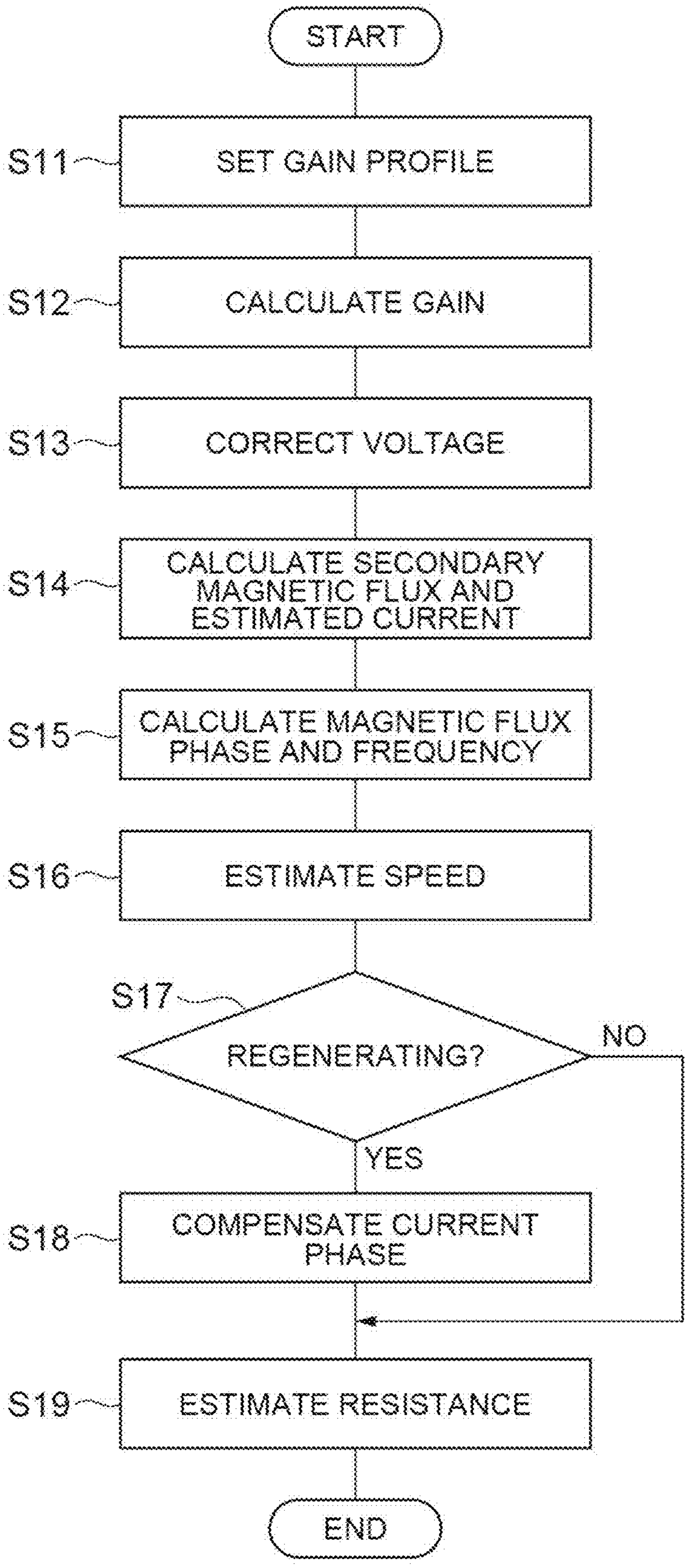
FIG. 14 is a flowchart illustrating an example procedure for calculating an estimated secondary magnetic flux and an estimated current.

FIG. 14 is a flowchart illustrating an example procedure for estimating the estimated secondary magnetic flux vector Φ2_est and rotational speed ωm_est in the operation S02. As illustrated in FIG. 14, the control circuitry 100 performs operations S11 and S12. In the operation S11, the profile change unit 251 sets the gain profile based on the rotational speed ωm_est. For example, the profile change unit 251 sets the gain profile to be the first gain profile when the rotational speed ωm_est is less than the speed level, sets the gain profile to be the second gain profile when the rotational speed ωm_est exceeds the speed level and is less than the second speed level, and sets the gain profile to be the third gain profile when the rotational speed ωm_est exceeds the second speed level. In the operation S12, the gain calculation unit 252 calculates the gains G1 to G4 based on the gain profile set by the profile change unit 251.

Next, the control circuitry 100 performs operations S13, S14, S15, and S16. In the operation S13, the voltage correction unit 211 corrects the detection result of the primary voltage based on the error profile representing a relationship between the detection result of the primary voltage V1 by the voltage sensor 18 and the detection error of the primary voltage V1 by the voltage sensor 18. Further, the voltage correction unit 211 adds a predetermined value to the detection result of the primary voltage V1. In the operation S14, the flux observer 210 calculates the estimated secondary magnetic flux vector Φ2_est and the estimated current i1_est based on a relationship among the primary voltage V1, the primary current i1, the rotational speed ωm_est, and the estimated secondary magnetic flux vector Φ2_est in the electric motor 3, the model of the electric motor 3, and a current error that is a difference between the estimated current i1_est based on the model of the electric motor 3 and the primary current i1, and the gains G1 to G4 calculated in the operation S12. In the operation S15, the angle estimation unit 220 calculates the estimated rotating angle θ_est based on the calculation result of the estimated secondary magnetic flux vector Φ2_est, and calculates the estimated primary frequency ω1_est by differentiating the estimated rotating angle θ_est. In the operation S16, the speed estimation unit 230 calculates the rotational speed ωm_est (estimates the rotational speed) based on the estimated secondary magnetic flux vector Φ2_est and the calculation result of the current error based on the calculation result of the estimated current i1_est.

Next, the control circuitry 100 performs a operation S17. In the operation S17, the phase compensation unit 241 checks whether the electric motor 3 is in the regenerative state based on the relationship between rotational speed ωm_est and the torque command T_ref and the like. In the operation S17, if the electric motor 3 is determined to be in the regenerative state, the control circuitry 100 performs a operation S18. In the operation S18, the phase compensation unit 241 advances the phase of the current error (the difference between the estimated current i1_est and the primary current i1). The phase compensation unit 241 may delay the phase of the estimated current i1_est instead of advancing the phase of the current error.

Next, the control circuitry 100 performs a operation S19. If it is determined in the operation S17 that the electric motor 3 is not in the regenerative state, the control circuitry 100 performs the operation S19 without performing the operation S18. In the operation S19, the resistance calculation unit 242 calculates the estimated primary resistance R1_est based on the calculation result of the estimated current i1_est and the calculation result of the current error. In a case where the operation S18 is executed, the resistance calculation unit 242 calculates the estimated primary resistance R1_est based on the calculation result of the estimated current i1_est in which the phase difference is guaranteed and the calculation result of the current error. The calculated estimated primary resistance R1_est is used for calculation of the gains G1 to G4 by the gain calculation unit 252 and calculation of the estimated secondary magnetic flux vector Φ2_est and the estimated current i1_est by the flux observer 210 as a part of the model of the electric motor 3 in the next control cycle. This completes the procedure for estimating the estimated secondary magnetic flux vector Φ2_est and the rotational speed ωm_est.

Starting Procedure

Figure 15:
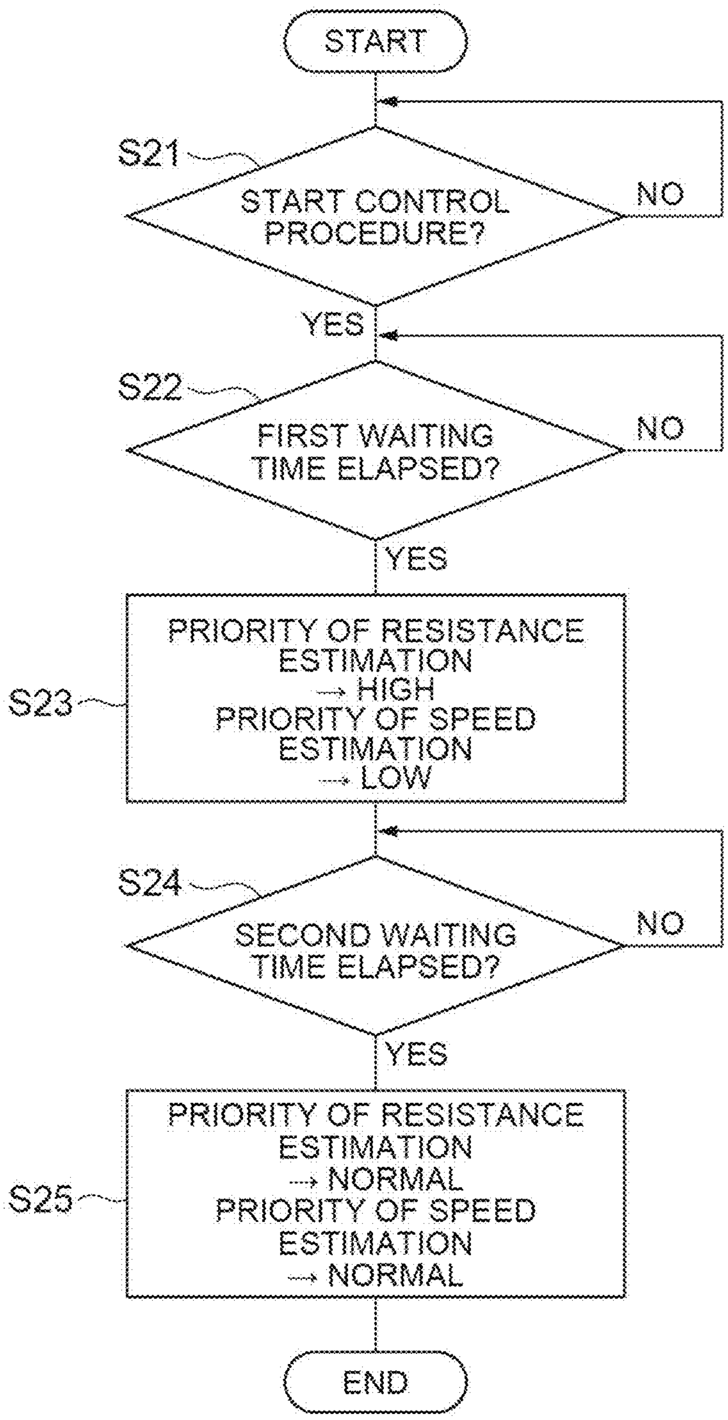
FIG. 15 is a flowchart illustrating an example procedure for starting an induction motor.

The starting procedure of FIG. 15 is a procedure for setting the speed identification gain and the primary resistance identification gain immediately after the start of the electric motor 3 control procedure. At the beginning of the starting procedure, both the speed identification gain and the primary resistance identification gain are set to zero. As illustrated in FIG. 15, the control circuitry 100 first performs operations S21, S22, and S23. In the operation S21, the priority setting unit 202 waits for the start of the control procedure of the electric motor 3. In the operation S22, the priority setting unit 202 waits for the elapse of a predetermined first waiting time. The first waiting time is set so that a rotating secondary-side flux is generated in the electric motor 3 by an initial excitation at the time of completion of the operation S22. In the operation S23, the priority setting unit 202 sets the speed identification gain to a value smaller than a normal value, and sets the primary resistance identification gain to a value higher than a normal value. Accordingly, the priority of the estimation of the primary resistance by the resistance estimation unit 240 with respect to the estimation of the rotational speed by the speed estimation unit 230 becomes higher than that in the normal state.

Next, the control circuitry 100 performs operations S24 and S25. In a operation S24, the priority setting unit 202 waits for the elapse of a predetermined second waiting time. The second waiting time is set so that the temporal change in the estimation result of the primary resistance by the resistance estimation unit 240 decreases to a predetermined convergence level at the time of completion of the operation S24. In the operation S25, the priority setting unit 202 sets the speed identification gain to the normal value and sets the primary resistance identification gain to the normal value. As a result, the priority of the estimation of the primary resistance by the resistance estimation unit 240 with respect to the estimation of the rotational speed by the speed estimation unit 230 is lowered to the priority in the normal state. The starting procedure is thus completed.

Stalling Avoidance Control Procedure

Figure 16:
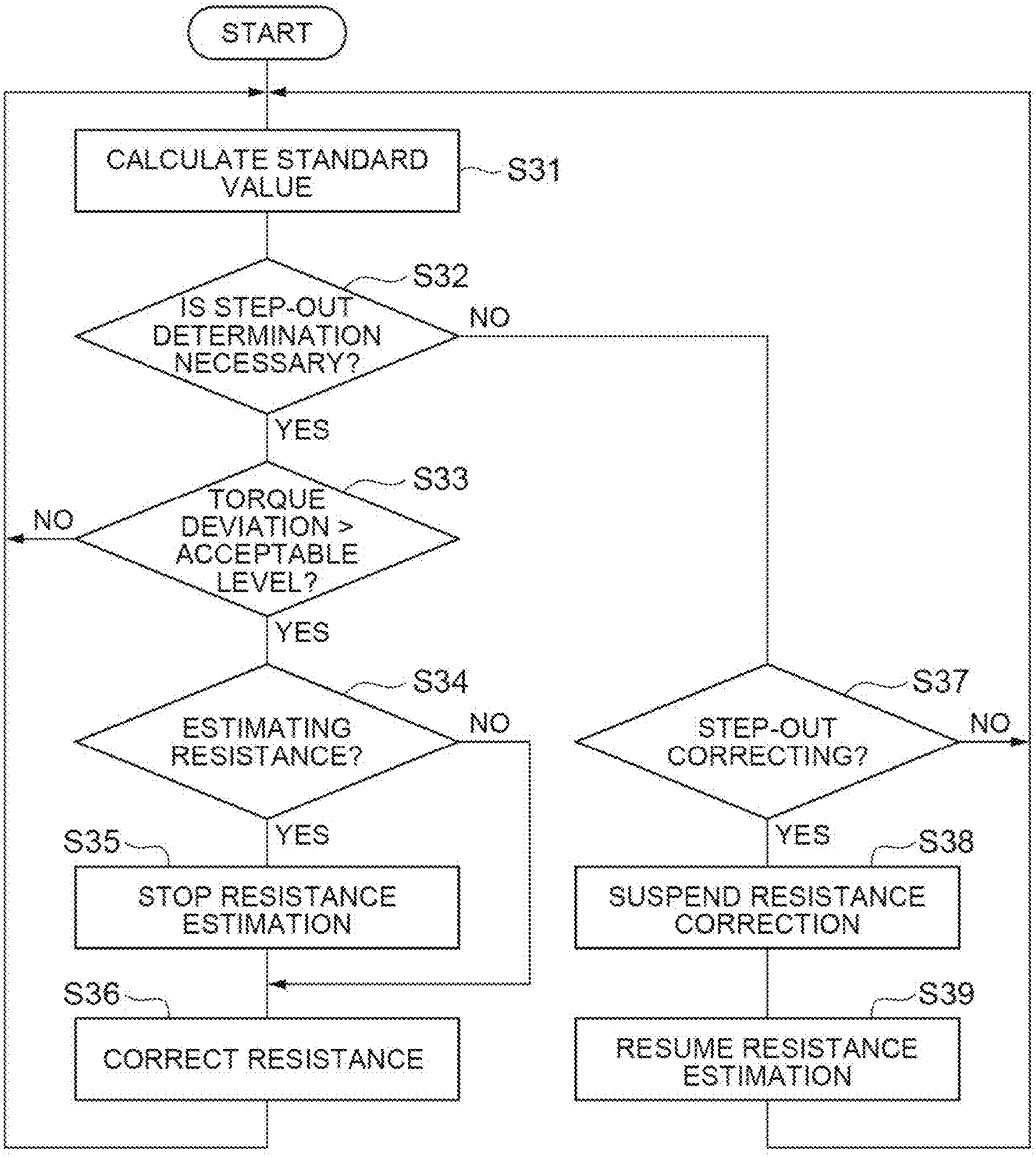
FIG. 16 is a flowchart illustrating an example stalling avoidance control procedure of an induction motor.

The stalling avoidance control procedure of FIG. 16 is executed in parallel with the control procedure of the electric motor 3 in a situation where the rotational speed of the electric motor 3 is small. As illustrated in FIG. 16, the control circuitry 100 performs operations S31 and S32. In the operation S31, the standard value calculation unit 261 calculates the standard value T0 of the torque based on the relationship among the secondary magnetic flux, the rotational speed, and the torque when the primary frequency is zero. In the operation S32, the resistance correction unit 263 checks whether the stalling determination is required. For example, the resistance correction unit 263 checks whether the rotational speed ωm_est is smaller than the stalling warning level.

If it is determined in the operation S32 that the rotational speed ωm_est is less than the stalling warning level, the control circuitry 100 performs a operation S33. In the operation S33, the resistance correction unit 263 checks whether the deviation between the torque command T_ref and the standard value T0 is greater than the acceptable level.

If it is determined in the operation S33 that the deviation between the torque command T_ref and the standard value T0 is greater than an acceptable level, the control circuitry 100 performs a operation S34. In the operation S34, the resistance correction unit 263 checks whether the resistance estimation unit 240 continues to estimate the primary resistance. If it is determined in the operation S34 that the resistance estimation unit 240 continues to estimate the primary resistance, the control circuitry 100 performs a operation S35. In the operation S35, the resistance correction unit 263 stops the estimation of primary resistance by the resistance estimation unit 240.

Next, the control circuitry 100 performs a operation S36. If it is determined in the operation S34 that the resistance estimation unit 240 has already stopped estimating primary resistance, the control circuitry 100 performs the operation S36 without performing the operation S35. In the operation S36, the resistance correction unit 263 corrects the estimated primary resistance R1_est to reduce the deviation between the torque command T_ref and the standard value TO. When the primary resistance is corrected by the resistance correction unit 263, the flux observer 210 calculates the estimated secondary magnetic flux vector Φ2_est and the estimated current i1_est based on the model including the estimated primary resistance R1_est2 corrected by the resistance correction unit 263.

The control circuitry 100 then cycles back to the operation S31. If it is determined in the operation S33 that the deviation between the torque command T_ref and the standard value T0 is less than the acceptable level, the control circuitry 100 returns the processing to the operation S31 without performing the operations S34 to S36.

If it is determined in the operation S32 that the rotational speed ωm_est is greater than the stalling warning level, the control circuitry 100 performs a operation S37. In the operation S37, the resistance correction unit 263 checks whether the correction of the estimated primary resistance R1_est is started. If it is determined in the operation S37 that the correction of the estimated primary resistance R1_est is started, the control circuitry 100 executes operations S38 and S39. In the operation S38, the resistance correction unit 263 stops correcting the estimated primary resistance R1_est. In the operation S39, the resistance correction unit 263 causes the resistance estimation unit 240 to resume estimating the primary resistance. The control circuitry 100 then returns the processing to the operation S31. If it is determined in the operation S37 that the correction of the estimated primary resistance R1_est is not started, the control circuitry 100 returns the processing to the operation S31 without performing the operations S38 and S39. The control circuitry 100 repeats the above process.

Selection Procedure of Mode for Avoiding Zero Frequency State

Figure 17:
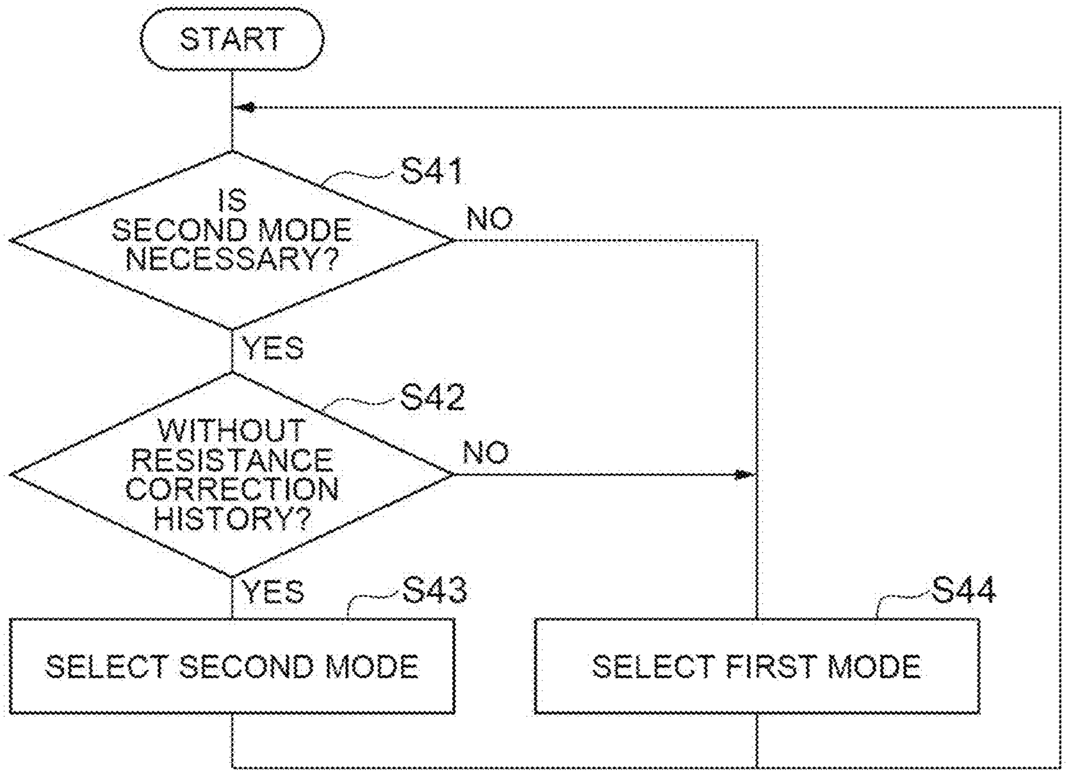
FIG. 17 is a flowchart illustrating an example selection procedure for avoiding zero frequency state.

The procedure illustrated in FIG. 17 is a procedure for selecting the mode for avoiding the zero frequency state described above and is executed in parallel with the control procedure of the electric motor 3. As illustrated in FIG. 17, the control circuitry 100 performs a operation S41. In the operation S41, the mode selection unit 117 checks whether the second mode is necessary. For example, when the second mode is designated by the user, the mode selection unit 117 determines that the second mode is necessary. The mode selection unit 117 may determine that the second mode is necessary if there is the above constraint condition for the rotational speed of the electric motor 3 rotor.

If it is determined in the operation S41 the second mode is required, the control circuitry 100 performs a operation S42. In the operation S42, it is checked whether there is a history of correction of the primary resistance by the resistance correction unit 263. If it is determined in the operation S42 that there is no history of correction of the primary resistance, the control circuitry 100 performs a operation S43. In the operation S43, the mode selection unit 117 selects the second mode.

If it is determined in the operation S41 that the second mode is not required, and if it is determined in the operation S42 that there is a history of correction of the primary resistance, the control circuitry 100 performs a operation S44. In the operation S44, the mode selection unit 117 selects the first mode. After performing the operations S43, S44, the control circuitry 100 returns the processing to the operation S41. The control circuitry 100 repeats the above process.

Torque Correction Procedure

Figure 18:
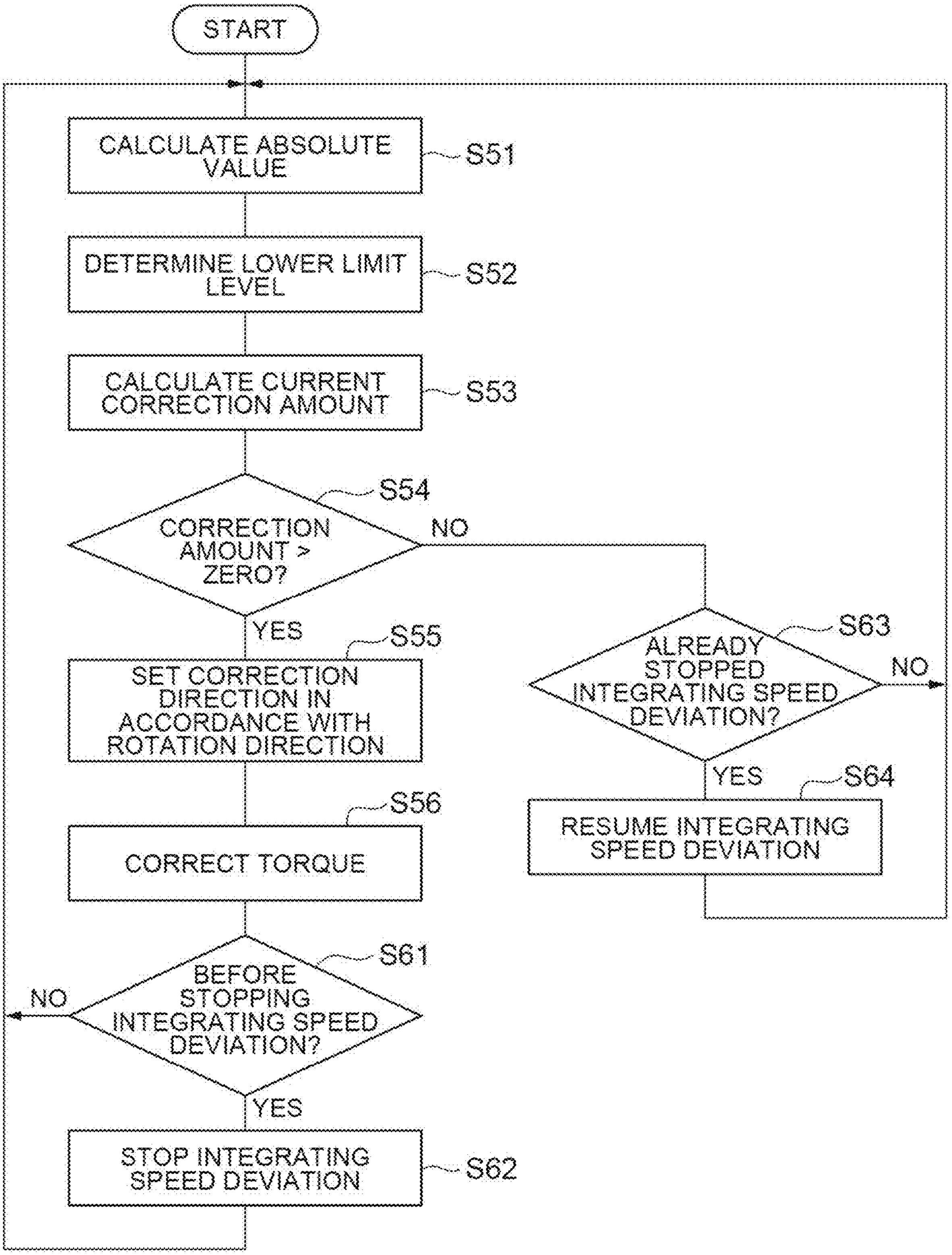
FIG. 18 is a flowchart illustrating an example torque correction procedure in a first mode.

The procedure illustrated in FIG. 18 is a procedure for avoiding the zero frequency state in the first mode, and is executed in parallel with the control procedure of the electric motor 3. As illustrated in FIG. 18, the control circuitry 100 performs operations S51, S52, S53, and S54. In the operation S51, the absolute value calculation unit 141 calculates the absolute value of the torque command T_ref, and the absolute value calculation unit 142 calculates the absolute value of the estimated primary frequency ω1_est. In the operation S52, the lower limit determination unit 143 determines the lower limit level LV based on the lower limit profile and the absolute value of the torque command T_ref. In the operation S53, the PI calculation unit 144 performs a proportional operation, a proportional-integral operation, a proportional-integral-derivative operation, or the like on a deviation (frequency deviation) between the lower limit level LV and absolute values in the estimated primary frequency ω1_est to calculate a correction amount (magnitude of the current correction value Δiq) of a torque command for reducing the frequency deviation. In the operation S54, the limiter 145 checks whether the correction amount is larger than zero.

If it is determined in the operation S54 that the correction amount is larger than zero, the control circuitry 100 performs operations S55 and S56. In the operation S55, the sign determination unit 146 determines the sign of the rotational speed ωm_est. The multiplication unit 147 calculates the current correction value Δiq by multiplying the current correction value Δiq that has passed through the limiter 145 by the sign determined by the sign determination unit 146. As a result, the torque correction direction (the direction in which the magnitude of the torque is increased) is matched with the rotation direction of the rotor of the electric motor 3. In a operation S56, the multiplication unit 147 adds the multiplication result to iq_ref. Accordingly, iq_ref corresponding to the torque command T_ref is corrected so as to accelerate the electric motor 3 in the direction during rotation.

Next, the control circuitry 100 performs a operation S61. In the operation S61, the anti-windup unit 148 checks whether the integration operation of the speed deviation by the integration calculation unit 123 of the torque command generation unit 120 has not been stopped. If it is determined in the operation S61 that the integration operation has not been stopped, the control circuitry 100 performs a operation S62. In the operation S62, the anti-windup unit 148 stops the integration operation by the integration calculation unit 123. The control circuitry 100 then returns the processing to the operation S51. If it is determined in the operation S61 that the integration operation has been stopped, the control circuitry 100 returns the processing to the operation S51 without executing the operation S62.

If it is determined in the operation S54 that the correction amount is smaller than zero, the control circuitry 100 performs a operation S63. In the operation S63, the anti-windup unit 148 checks whether the integration operation of the speed deviation by the integration calculation unit 123 of the torque command generation unit 120 has been stopped. If it is determined in the operation S63 that the integration operation by the integration calculation unit 123 has been stopped, the control circuitry 100 performs a operation S64. In the operation S64, the anti-windup unit 148 restarts the integration operation by the integration calculation unit 123. The control circuitry 100 then returns the processing to the operation S51. The control circuitry 100 repeats the above process.

Magnetic Flux Correction Procedure

Figure 19:
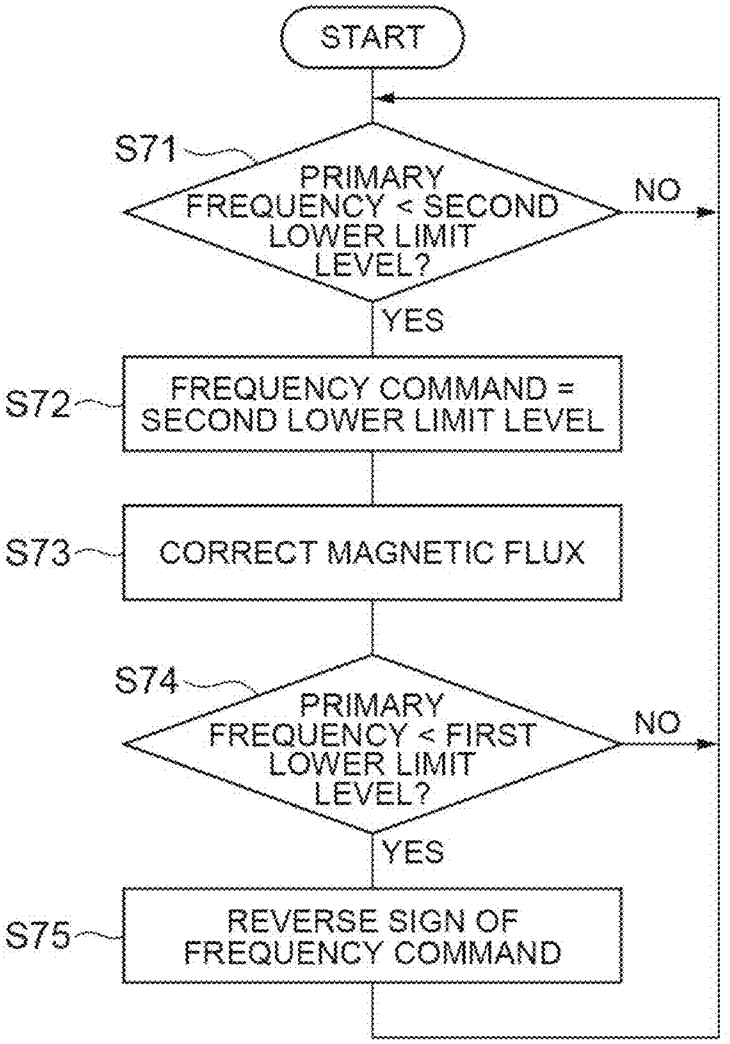
FIG. 19 is a flowchart illustrating an example magnetic flux correction procedure in a second mode.

The procedure illustrated in FIG. 19 is a procedure for avoiding the zero frequency state in the second mode, and is executed in parallel with the control procedure of the electric motor 3. As illustrated in FIG. 19, the control circuitry 100 performs a operation S71. In the operation S71, the target frequency determination unit 131 checks whether the estimated primary frequency ω1_est is smaller than the above-described second lower limit level. If it is determined in the operation S71 that the estimated primary frequency ω1_est is less than the second lower limit level, the control circuitry 100 performs operations S72, S73, and S74. In the operation S72, the target frequency determination unit 131 determines the target primary frequency ω1_ref having the same sign as the sign of the primary frequency and the same magnitude as the magnitude of the second lower limit level. In the operation S73, the magnetic flux correction unit 132 corrects the secondary magnetic flux command vector Φ2_ref to reduce the deviation (frequency deviation) between the target primary frequency ω1_ref and the estimated primary frequency ω1_est.

Next, the control circuitry 100 performs the operation S74. In the operation S74, the target frequency determination unit 131 checks whether the estimated primary frequency ω1_est is less than the above-described first lower limit level. If it is determined in the operation S71 that the estimated primary frequency ω1_est is less than the first lower limit level, the control circuitry 100 performs a operation S75. In the operation S75, the target frequency determination unit 131 reverses the sign of the target primary frequency ω1_ref. The control circuitry 100 then returns the processing to the operation S71. If it is determined in the operation S74 that the estimated primary frequency ω1_est is greater than the first lower limit level, the control circuitry 100 returns the processing to the operation S71 without performing the operation S75. If it is determined in the operation S71 that the estimated primary frequency ω1_est is greater than the second lower limit level, the control circuitry 100 performs the processing to the operation S71 again without executing the operations S72 to S75. The control circuitry 100 repeats the above process.

The above disclosures include followings.

(1) The power conversion device 2 including: the power conversion circuitry 10 configured to supply drive power to an induction motor; the torque command generation unit 120 configured to generate a torque command; the torque correction unit 140 configured to, when the magnitude of the primary frequency of the induction motor is less than a predetermined the lower limit level LV, correct the torque command so that the magnitude of the primary frequency approaches the lower limit level LV; and the torque control unit 112 configured to control the power conversion circuitry 10 so that the induction motor generates a torque corresponding to the torque command.

As the magnitude of the primary frequency decreases, the influence of the error of the sensorless estimation increases. With this power conversion device 2, since the torque is corrected so as to maintain the magnitude of the primary frequency in the vicinity of the lower limit level LV, an excessive influence of the error of the sensorless estimation may be avoided. Since the correction target is the torque, the primary frequency can be maintained in the vicinity of the lower limit level LV in both cases where the control target is the rotational speed of the induction motor and where the control target is the torque. Accordingly, the stability of the sensorless control of the induction motor may be improved.

(2) The power conversion device 2 according to (1), wherein the torque correction unit 140 is configured to correct the torque command so that the primary frequency approaches the lower limit level LV by accelerating the rotor of the induction motor in a present rotating direction. The primary frequency can readily be maintained in the vicinity of the lower limit level LV.

(3) The power conversion device 2 according to (1) or (2), further including a lower limit determination unit configured to determine the lower limit level LV based on a lower limit profile and the torque command before correction, the lower limit profile being defined in advance to represent a relationship between the torque command and the lower limit level LV, wherein the torque correction unit 140 is configured to correct the torque command based on the lower limit level LV determined by the lower limit determination unit.

A difference in influence of an error of sensorless estimation due to a difference in torque may be reduced.

(4) The power conversion device 2 according to (3), wherein the lower limit profile is defined such that the lower limit level LV increases in accordance with an increase in the torque command.

An increase in the influence of the error of the sensorless estimation as the torque increases may be prevented.

(5) The power conversion device 2 according to (4), wherein the lower limit profile is defined so as to limit the lower limit level LV to a predetermined limit value or less.

In a case where a target rotational speed is set to the rotational speed of the rotor of the induction motor, deviation of the rotational speed from the target rotational speed can be suppressed.

(6) The power conversion device 2 according to any one of (1) to (5), wherein the torque command generation unit 120 includes an integrating unit configured to integrate a deviation between a target rotational speed and a rotational speed of the rotor of the induction motor, and is configured to generate a torque command so as to reduce a result of integration by the integrating unit, and the power conversion device 2 further includes the anti-windup unit 148 configured to stop integration of the deviation by the integrating unit when the torque command is corrected based on the lower limit level LV.

By increasing the integration result, cancellation of correction by the torque correction unit 140 can be avoided.

(7) The power conversion device 2 according to any one of (1) to (6), further including: the target frequency determination unit 131 configured to, when the magnitude of the primary frequency approaches zero, determine a target frequency having a sign opposite to a sign of the primary frequency; the magnetic flux correction unit 132 configured to correct a magnetic flux command to reduce a deviation between the target frequency and the primary frequency; the magnetic flux control unit 111 configured to control the power conversion circuitry 10 so that the induction motor generates a secondary magnetic flux corresponding to the magnetic flux command; and the mode selection unit 117 configured to select one of a first mode in which the torque correction unit 140 corrects the torque command and a second mode in which the magnetic flux correction unit 132 changes the magnetic flux command.

In a case where the rotational speed of the rotor of the induction motor can be deviated from the target rotational speed, the influence of the error of the sensorless estimation can be reduced by using the first mode. In a case where the rotational speed of the rotor of the induction motor cannot be deviated from the target rotational speed, the influence of the error of the sensorless estimation can be reduced by using the second mode instead of the first mode.

(8) The power conversion device 2 according to (7), wherein the target frequency determination unit 131 is configured to, when the magnitude of the primary frequency decreases to the first lower limit level LV1, determine a target frequency larger than the first lower limit level LV1.

Frequent reversing of the sign of the primary frequency can be reduced.

(9) The power conversion device 2 according to (8), wherein the target frequency determination unit 131 is configured to, when the magnitude of the primary frequency according to the magnetic flux command before correction decreases to the second lower limit level LV2 larger than the first lower limit level LV1, determine a target frequency having the same sign as the sign of the primary frequency and the same magnitude as the magnitude of the second lower limit level LV2 and, when the magnitude of the primary frequency according to the magnetic flux command corrected by the magnetic flux correction unit 132 based on the target frequency decreases to the first lower limit level LV1, invert the sign of the target frequency.

The frequency of reversing the sign of the primary frequency may further be reduced.

(10) The power conversion device 2 according to any one of (7) to (9), wherein, in the second mode, the torque control unit 112 is configured to control the power conversion circuitry 10 so as to cancel a change in the torque caused by the correction of the magnetic flux command.

The influence of the correction of the magnetic flux command on the operation of the induction motor can be reduced.

(11) The power conversion device 2 according to any one of (7) to (9), wherein the mode selection unit 117 is configured to select either the first mode or the second mode based on a user setting.

By leaving the switching between the first mode and the second mode to the user setting, the device configuration can be simplified.

(12) The power conversion device 2 according to any one of (7) to (11), wherein the mode selection unit 117 is configured to select one of the first mode or the second mode based on whether there is a constraint condition for the rotational speed of the rotor of the induction motor.

The convenience can be improved.

(13) The power conversion device 2 according to any one of (7) to (12), wherein the torque control unit 112 is configured to control the power conversion circuitry 10 so that the induction motor generates the torque corresponding to the torque command based on a model of the induction motor including a primary resistance of the induction motor, and wherein the power conversion device 2 further includes: a standard value calculation unit configured to calculate a standard value of the torque based on a relationship among the secondary magnetic flux, the rotational speed, and the torque when the primary frequency is zero; and a resistance correction unit configured to, when a deviation between the torque command and the standard value of the torque is greater than an acceptable level, correct the primary resistance in the model to reduce the deviation. The influence of the error of the sensorless estimation may further be reduced.

(14) The power conversion device 2 according to (13), further including a mode limiting unit configured to cause the mode selection unit 117 to select the first mode when the primary resistance is corrected by the resistance correction unit.

By executing the second mode when the influence of the error of the sensorless estimation is large, a situation in which reversing of the sign of the primary frequency fails may be avoided.

(15) The power conversion device 2 including: the power conversion circuitry 10 configured to supplying drive power to the induction motor; the target frequency determination unit 131 configured to, when a magnitude of the primary frequency of the induction motor approaches zero, determine a target frequency having a sign opposite to a sign of the primary frequency; the magnetic flux correction unit 132 configured to correct the magnetic flux command so as to reduce a deviation between the target frequency and the primary frequency; and the magnetic flux control unit 111 configured to control the power conversion circuitry 10 so that the induction motor generates a secondary magnetic flux corresponding to the magnetic flux command.

In a case where the rotational speed of the rotor of the induction motor is prohibited to be deviated from the target rotational speed, the influence of the error of the sensorless estimation can be reduced.

(16) A method of controlling the power conversion circuitry 10 configured to supply drive power to an induction motor, the method including: generating a torque command for the induction motor; correcting, when the primary frequency of the induction motor falls below the lower limit level LV that is predetermined, the torque command so that the magnitude of the primary frequency approaches the lower limit level LV; and controlling the power conversion circuitry 10 so that the induction motor generates a torque corresponding to the torque command.

(17) A method of controlling the power conversion circuitry 10 configured to supply drive power to an induction motor, the method including: determining, when a magnitude of a primary frequency of the induction motor approaches zero, a target frequency having a sign opposite to a sign of a primary frequency; correcting a magnetic flux command so as to reduce a deviation between the target frequency and the primary frequency; and controlling the power conversion circuitry 10 so that the induction motor generates a secondary magnetic flux corresponding to the magnetic flux command.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A power conversion device comprising:

power conversion circuitry configured to supply a current having a primary frequency to a primary winding of an induction motor; and control circuitry configured to:

generate a torque command;

correct the torque command, in response to determining that a magnitude of the primary frequency of the induction motor is less than a lower limit level having a non-zero magnitude, so that the magnitude of the primary frequency approaches the lower limit level; and control the power conversion circuitry to supply the current so that the induction motor generates a torque corresponding to the corrected torque command.

2. The power conversion device according to claim 1, wherein the control circuitry is configured to correct the torque command to accelerate a rotor of the induction motor in a present rotating direction so that the primary frequency approaches the lower limit level.

3. The power conversion device according to claim 1, wherein the control circuitry is further configured to:

determine the lower limit level based on a lower limit profile and the torque command before correction, the lower limit profile being defined in advance to represent a relationship between the torque command and the lower limit level; and correct the torque command based on the determined lower limit level.

4. The power conversion device according to claim 3, wherein the lower limit profile is defined such that the lower limit level increases as the torque command increases.

5. The power conversion device according to claim 4, wherein the lower limit profile is defined so as to limit the lower limit level to be less than or equal to a predetermined limit value.

6. The power conversion device according to claim 1, wherein the control circuitry is configured to:

integrate a deviation between a target rotational speed and a rotational speed of a rotor of the induction motor;

generate the torque command so as to reduce a result of integrating the deviation; and stop integrating the deviation in response to determining that the torque command is corrected based on the lower limit level.

7. The power conversion device according to claim 1, wherein the control circuitry is further configured to selectively execute a first mode of operation or a second mode of operation, wherein the first mode of operation comprises:

generating the torque command;

correcting the torque command, in response to determining that the magnitude of the primary frequency of the induction motor is less than the lower limit level, so that the magnitude of the primary frequency approaches the lower limit level; and controlling the power conversion circuitry so that the induction motor generates the torque corresponding to the torque command, and wherein the second mode of operation comprises:

determining, in response to determining that the magnitude of the primary frequency approaches zero, a target frequency having an inverse sign to a sign of the primary frequency;

correcting a magnetic flux command to reduce a deviation between the target frequency and the primary frequency; and controlling the power conversion circuitry so that the induction motor generates a secondary magnetic flux corresponding to the magnetic flux command.

8. The power conversion device according to claim 7, wherein said determining the target frequency includes determining, in response to determining that the magnitude of the primary frequency decreases to a first lower limit level, the target frequency greater than the first lower limit level.

9. The power conversion device according to claim 8, wherein said determining the target frequency includes:

determining, in response to determining that the magnitude of the primary frequency according to the magnetic flux command before correction decreases to a second lower limit level greater than the first lower limit level, the target frequency having the same sign as the sign of the primary frequency and the same magnitude as the magnitude of the second lower limit level; and inverting the sign of the target frequency, in response to determining that the magnitude of the primary frequency according to the corrected magnetic flux command decreases to the first lower limit level.

10. The power conversion device according to claim 7, wherein the second mode of operation further comprises controlling the power conversion circuitry so as to reduce a change in the torque caused by correcting the magnetic flux command.

11. The power conversion device according to claim 7, wherein the control circuitry is configured to select the first mode of operation or the second mode of operation based on a user setting.

12. The power conversion device according to claim 7, wherein the control circuitry is configured to select the first mode of operation or the second mode of operation based on whether there is a constraint condition for a rotational speed of a rotor of the induction motor.

13. The power conversion device according to claim 7, wherein the second mode of operation further comprises controlling the power conversion circuitry so that the induction motor generates the torque corresponding to the torque command based on a model of the induction motor including a primary resistance of the induction motor, and wherein the control circuitry is further configured to:

calculate a standard value of the torque based on a relationship among the secondary magnetic flux, a rotation speed, and the torque, the relationship being under a condition where the primary frequency is zero; and correct the primary resistance in the model, in response to determining that a deviation between the torque command and the standard value of the torque is greater than a predetermined level, to reduce the deviation.

14. The power conversion device according to claim 13, wherein the control circuitry is further configured to select the first mode of operation in response to determining that the primary resistance is corrected.

15. A power conversion device comprising:
power conversion circuitry configured to supply drive power to an induction motor;
one or more processing devices; and
one or more memory devices including computer program code configured to cause the one or more processing devices to:
determine, in response to determining that a magnitude of a primary frequency of the induction motor approaches zero, a target frequency having an inverse sign to a sign of the primary frequency;
correct a magnetic flux command so as to reduce a deviation between the target frequency and the primary frequency; and
control the power conversion circuitry so that the induction motor generates a secondary magnetic flux corresponding to the magnetic flux command.

16. The power conversion device according to claim 15, wherein the computer program code is configured to cause the one or more processing devices to determine, in response to determining that a magnitude of the primary frequency decreases to a first lower limit level, the target frequency greater than the first lower limit level.

17. The power conversion device according to claim 16, wherein the computer program code is configured to cause the one or more processing devices to:
determine, in response to determining that the magnitude of the primary frequency according to the magnetic flux command before correction decreases to a second lower limit level greater than the first lower limit level, the target frequency having the same sign as the sign of the primary frequency and the same magnitude as the magnitude of the second lower limit level; and
invert the sign of the target frequency, in response to determining that the magnitude of the primary frequency according to the corrected magnetic flux command decreases to the first lower limit level.

18. The power conversion device according to claim 15, wherein the computer program code is further configured to cause the one or more processing devices to reduce a change in a torque generated by the induction motor, the change being caused by correcting the magnetic flux command.

19. A method of controlling power conversion circuitry configured to supply drive power to an induction motor, the method comprising:
generating a torque command for the induction motor;
determining a lower limit level based on a lower limit profile and the torque command, wherein the lower limit profile is defined such that the lower limit level increases as the torque command increases;
correcting the torque command, when a magnitude of a primary frequency of the induction motor falls below the lower limit level, so that the magnitude of the primary frequency approaches the lower limit level; and
controlling the power conversion circuitry so that the induction motor generates a torque corresponding to the torque command.

20. The method according to claim 19, wherein said correcting the torque command includes correcting the torque command to accelerate a rotor of the induction motor in a present rotating direction so that the primary frequency approaches the lower limit level.

* * * * *